US00RE47574E

(19) United States
(12) Reissued Patent
Terech et al.

(10) Patent Number: US RE47,574 E
(45) Date of Reissued Patent: Aug. 20, 2019

(54) STRUCTURE BASED FLUID DISTRIBUTION SYSTEM

(71) Applicant: Gentherm Incorporated, Northville, MI (US)

(72) Inventors: John Terech, Milan, MI (US); David Marquette, Farmington Hills, MI (US)

(73) Assignee: Gentherm Incorporated, Northville, MI (US)

(21) Appl. No.: 14/864,704

(22) Filed: Sep. 24, 2015

Related U.S. Patent Documents

Reissue of:
(64) Patent No.: 8,539,624
Issued: Sep. 24, 2013
Appl. No.: 11/561,316
Filed: Nov. 17, 2006

U.S. Applications:
(60) Provisional application No. 60/809,459, filed on May 31, 2006.

(51) Int. Cl.
*A47C 16/00* (2006.01)
*A47C 7/74* (2006.01)

(52) U.S. Cl.
CPC ..... *A47C 7/74* (2013.01)

(58) Field of Classification Search
CPC ..... A47C 7/74
USPC ..... 297/180.1, 180.13, 180.14; 5/423, 652.2, 5/726
See application file for complete search history.

(56) References Cited

U.S. PATENT DOCUMENTS 1,541,213 A 6/1925 Harley
2,782,834 A 2/1957 Vigo
2,826,135 A 3/1958 Benzick
2,912,832 A 11/1959 Clark
2,978,972 A 4/1961 Hake
2,992,604 A 7/1961 Trotman et al.
3,030,145 A 4/1962 Kottemann
(Continued)

FOREIGN PATENT DOCUMENTS

DE 102 38 552 8/2001
DE 101 15 242 10/2002
(Continued)

OTHER PUBLICATIONS

English language abstract of JP 58-185952, 1 pg.*
(Continued)

*Primary Examiner* — Robert M Fetsuga
(74) *Attorney, Agent, or Firm* — Knobbe, Martens, Olson & Bear LLP

(57) ABSTRACT

A climate controlled seat assembly includes a seat cushion that has an outer surface with a first side for supporting an occupant in a seated position and a second side, which generally faces in an opposite direction than the first side. An air passage extends from the first side to the second side of the seat cushion. A support member has a first side that is configured to provide support to the seat cushion and a second side. the first side and the second side of the support member generally face in opposite directions. A distribution passage is in communication with the air passage and is formed at least in part by a recess formed at least in part in one of the first side of the support member and the second side of the seat cushion.

18 Claims, 17 Drawing Sheets

(56) References Cited

U.S. PATENT DOCUMENTS 3,136,577 A 6/1964 Richard
3,137,523 A 6/1964 Karner
3,162,489 A 12/1964 Trotman
3,209,380 A 10/1965 Watsky
3,486,177 A 12/1969 Marschack
3,550,523 A 12/1970 Segal
3,681,797 A * 8/1972 Messner ..... A47C 21/046 297/180.13
3,785,165 A 1/1974 Valenzuela, Jr.
3,818,522 A * 6/1974 Schuster ..... A47C 21/046 297/452.47
4,002,108 A 1/1977 Drori
4,065,936 A 1/1978 Fenton et al.
4,379,352 A 4/1983 Häuslein et al.
4,413,857 A 11/1983 Hayashi
4,437,702 A 3/1984 Agosta
4,563,387 A 1/1986 Takagi et al.
4,567,351 A 1/1986 Kitagawa et al.
4,572,430 A 2/1986 Takagi et al.
4,671,567 A 6/1987 Frobose
4,685,727 A 8/1987 Cremer et al.
4,686,724 A * 8/1987 Bedford ..... A61G 7/05707 5/652.1
4,777,802 A 10/1988 Feher
4,847,933 A * 7/1989 Bedford ..... A61G 5/1043 5/652.2
4,923,248 A 5/1990 Feher
4,981,324 A 1/1991 Law
5,002,336 A 3/1991 Feher
5,016,302 A 5/1991 Yu
5,077,709 A 12/1991 Feher
5,088,790 A 2/1992 Wainwright et al.
5,106,161 A 4/1992 Meiller
5,117,638 A * 6/1992 Feher ..... 62/3.2
5,172,564 A 12/1992 Reedy
5,226,188 A 7/1993 Liou
5,256,857 A 10/1993 Curhan et al.
5,385,382 A 1/1995 Single, II et al.
5,505,520 A 4/1996 Frusti et al.
5,524,439 A 6/1996 Gallup et al.
5,597,200 A * 1/1997 Gregory et al. ..... 297/180.13
5,606,639 A 2/1997 Lehoe et al.
5,626,021 A 5/1997 Karunasiri et al.
5,645,314 A 7/1997 Liou
5,850,741 A 12/1998 Feher
5,887,304 A 3/1999 Von der Heyde
5,921,314 A 7/1999 Schuller et al.
5,924,766 A 7/1999 Esaki et al.
5,927,599 A 7/1999 Kath
5,927,817 A 7/1999 Ekman et al.
5,934,748 A 8/1999 Faust et al.
6,003,950 A 12/1999 Larsson
6,019,420 A 2/2000 Faust et al.
6,048,024 A 4/2000 Wallman
6,059,018 A 5/2000 Yoshinori et al.
6,062,641 A 5/2000 Suzuki et al.
6,079,485 A 6/2000 Esaki et al.
6,085,369 A 7/2000 Feher
6,119,463 A 9/2000 Bell
6,145,925 A 11/2000 Eksin et al.
6,179,706 B1 1/2001 Yoshinori et al.
6,186,592 B1 2/2001 Orizaris et al.
6,189,966 B1 2/2001 Faust et al.
6,196,627 B1 3/2001 Faust et al.
6,206,465 B1 3/2001 Faust et al.
6,223,539 B1 5/2001 Bell
6,263,530 B1 7/2001 Feher
6,291,803 B1 9/2001 Fourrey
6,474,072 B2 11/2002 Needham
6,481,801 B1 11/2002 Schmale
6,509,704 B1 1/2003 Brown
6,541,737 B1 4/2003 Eksin et al.
RE38,128 E 6/2003 Gallup et al.
6,598,251 B2 7/2003 Habboub et al.
6,604,785 B2 8/2003 Bargheer et al.
6,606,866 B2 8/2003 Bell
6,619,736 B2 9/2003 Stowe et al.
6,619,737 B2 9/2003 Kunkel et al.
6,626,488 B2 * 9/2003 Pfahler ..... 297/180.11
6,644,735 B2 11/2003 Bargheer et al.
6,676,207 B2 1/2004 Rauh et al.
6,685,553 B2 2/2004 Aoki
6,695,402 B2 2/2004 Sloan, Jr.
6,700,052 B2 3/2004 Bell
6,739,655 B1 5/2004 Schwochert et al.
6,761,399 B2 7/2004 Bargheer et al.
6,774,346 B2 8/2004 Clothier
6,786,541 B2 9/2004 Haupt et al.
6,786,545 B2 9/2004 Bargheer et al.
6,790,481 B2 9/2004 Bishop et al.
6,808,230 B2 10/2004 Buss et al.
6,828,528 B2 12/2004 Stowe et al.
6,841,957 B2 1/2005 Brown
6,855,880 B2 2/2005 Feher
6,857,697 B2 2/2005 Brennan et al.
6,892,807 B2 5/2005 Fristedt et al.
6,893,086 B2 5/2005 Bajic et al.
6,907,739 B2 6/2005 Bell
6,954,944 B2 10/2005 Feher
6,976,734 B2 12/2005 Stoewe
7,040,710 B2 5/2006 White et al.
7,070,232 B2 7/2006 Minegishi et al.
7,108,319 B2 9/2006 Hartwich et al.
7,114,771 B2 10/2006 Lofy et al.
7,124,593 B2 10/2006 Feher
7,131,689 B2 11/2006 Brennan et al.
7,147,279 B2 12/2006 Bevan et al.
7,168,758 B2 1/2007 Bevan et al.
7,178,344 B2 2/2007 Bell
7,201,441 B2 4/2007 Stoewe et al.
7,213,876 B2 5/2007 Stoewe
7,261,372 B2 8/2007 Aoki
7,272,936 B2 9/2007 Feher
7,338,117 B2 3/2008 Iqbal et al.
7,425,034 B2 9/2008 Bajic et al.
7,462,028 B2 12/2008 Cherala et al.
7,475,464 B2 1/2009 Lofy et al.
7,480,950 B2 1/2009 Feher
7,506,938 B2 3/2009 Brennan et al.
7,587,901 B2 9/2009 Petrovski
7,591,507 B2 9/2009 Giffin et al.
7,607,739 B2 10/2009 Browne et al.
7,640,754 B2 1/2010 Wolas
7,665,803 B2 2/2010 Wolas
7,708,338 B2 5/2010 Wolas
RE41,765 E 9/2010 Gregory et al.
7,827,620 B2 11/2010 Feher
7,827,805 B2 11/2010 Comiskey et al.
7,862,113 B2 1/2011 Knoll
7,866,017 B2 1/2011 Knoll
7,877,827 B2 2/2011 Marquette et al.
7,937,789 B2 5/2011 Feher
7,963,594 B2 6/2011 Wolas
7,966,835 B2 6/2011 Petrovski
7,996,936 B2 8/2011 Marquette et al.
8,065,763 B2 11/2011 Brykalski et al.
8,104,295 B2 1/2012 Lofy
8,143,554 B2 3/2012 Lofy
8,181,290 B2 5/2012 Brykalski et al.
8,191,187 B2 6/2012 Brykalski et al.
8,222,511 B2 7/2012 Lofy
8,256,236 B2 9/2012 Lofy
8,332,975 B2 12/2012 Brykalski et al.
8,402,579 B2 3/2013 Marquette et al.
8,418,286 B2 4/2013 Brykalski et al.
8,434,314 B2 5/2013 Comiskey et al.
8,438,863 B2 5/2013 Lofy
RE44,272 E 6/2013 Bell
8,505,320 B2 8/2013 Lofy
8,516,842 B2 8/2013 Petrovski
8,539,624 B2 9/2013 Terech et al.
8,575,518 B2 11/2013 Walsh
8,621,687 B2 1/2014 Brykalski et al.
8,732,874 B2 5/2014 Brykalski et al.

(56) References Cited

U.S. PATENT DOCUMENTS

| | | | |
|---|---|---|---|
| 8,782,830 | B2 | 7/2014 | Brykalski et al. |
| 8,893,329 | B2 | 11/2014 | Petrovksi |
| 8,969,703 | B2 | 3/2015 | Makansi et al. |
| 9,105,808 | B2 | 8/2015 | Petrovksi |
| 9,105,809 | B2 | 8/2015 | Lofy |
| 9,121,414 | B2 | 9/2015 | Lofy et al. |
| 9,125,497 | B2 | 9/2015 | Brykalski et al. |
| 9,335,073 | B2 | 5/2016 | Lofy |
| 9,622,588 | B2 | 4/2017 | Brykalski et al. |
| 9,651,279 | B2 | 5/2017 | Lofy |
| 9,662,962 | B2 | 5/2017 | Steinman et al. |
| 9,685,599 | B2 | 6/2017 | Petrovski et al. |
| 9,814,641 | B2 | 11/2017 | Brykalski et al. |
| 2002/0003362 | A1* | 1/2002 | Kunkel et al. ..... 297/180.14 |
| 2002/0011071 | A1 | 1/2002 | Needham |
| 2002/0017102 | A1 | 2/2002 | Bell |
| 2002/0195844 | A1 | 12/2002 | Hipwell |
| 2003/0039298 | A1 | 2/2003 | Eriksson et al. |
| 2003/0145380 | A1 | 8/2003 | Schmid |
| 2004/0090093 | A1 | 5/2004 | Kamiya et al. |
| 2004/0195870 | A1 | 10/2004 | Bohlender et al. |
| 2004/0255364 | A1 | 12/2004 | Feher |
| 2005/0067862 | A1 | 3/2005 | Iqbal et al. |
| 2005/0202774 | A1 | 9/2005 | Lipke |
| 2005/0285438 | A1 | 12/2005 | Ishima et al. |
| 2006/0053529 | A1 | 3/2006 | Feher |
| 2006/0087160 | A1 | 4/2006 | Dong et al. |
| 2006/0137099 | A1 | 6/2006 | Feher |
| 2006/0137358 | A1 | 6/2006 | Feher |
| 2006/0175877 | A1 | 8/2006 | Alionte et al. |
| 2006/0197363 | A1 | 9/2006 | Lofy et al. |
| 2006/0214480 | A1 | 9/2006 | Terech |
| 2006/0244289 | A1 | 11/2006 | Bedro |
| 2006/0273646 | A1 | 12/2006 | Comiskey et al. |
| 2006/0284455 | A1 | 12/2006 | Terech |
| 2007/0001489 | A1 | 1/2007 | Terech |
| 2007/0040421 | A1 | 2/2007 | Zuzga et al. |
| 2007/0069554 | A1 | 3/2007 | Comiskey et al. |
| 2007/0086757 | A1 | 4/2007 | Feher |
| 2007/0158981 | A1 | 7/2007 | Almasi et al. |
| 2007/0200398 | A1 | 8/2007 | Wolas et al. |
| 2007/0204629 | A1 | 9/2007 | Lofy |
| 2007/0251016 | A1 | 11/2007 | Feher |
| 2007/0262621 | A1 | 11/2007 | Dong et al. |
| 2007/0277313 | A1 | 12/2007 | Terech |
| 2008/0000025 | A1 | 1/2008 | Feher |
| 2008/0047598 | A1 | 2/2008 | Lofy |
| 2008/0087316 | A1 | 4/2008 | Inaba et al. |
| 2008/0148481 | A1 | 6/2008 | Brykalski et al. |
| 2008/0164733 | A1 | 7/2008 | Giffin et al. |
| 2008/0166224 | A1 | 7/2008 | Giffin et al. |
| 2008/0173022 | A1 | 7/2008 | Petrovski |
| 2008/0223841 | A1 | 9/2008 | Lofy |
| 2009/0000031 | A1 | 1/2009 | Feher |
| 2009/0015027 | A1 | 1/2009 | Lambarth et al. |
| 2009/0025770 | A1 | 1/2009 | Lofy |
| 2009/0026813 | A1 | 1/2009 | Lofy |
| 2009/0033130 | A1 | 2/2009 | Marquette et al. |
| 2009/0126110 | A1 | 5/2009 | Feher |
| 2009/0193814 | A1 | 8/2009 | Lofy |
| 2009/0211619 | A1 | 8/2009 | Sharp et al. |
| 2009/0218855 | A1 | 9/2009 | Wolas |
| 2010/0011502 | A1 | 1/2010 | Brykalski et al. |
| 2010/0146700 | A1 | 6/2010 | Wolas |
| 2010/0193498 | A1 | 8/2010 | Walsh |
| 2010/0290215 | A1 | 11/2010 | Metcalf et al. |
| 2011/0048033 | A1 | 3/2011 | Comiskey et al. |
| 2011/0107514 | A1 | 5/2011 | Brykalski et al. |
| 2011/0115635 | A1 | 5/2011 | Petrovski et al. |
| 2011/0226751 | A1 | 9/2011 | Lazanja et al. |
| 2011/0253340 | A1 | 10/2011 | Petrovski |
| 2011/0260681 | A1 | 10/2011 | Guccione et al. |
| 2011/0271994 | A1 | 11/2011 | Gilley |
| 2011/0296611 | A1 | 12/2011 | Marquette et al. |
| 2012/0080911 | A1 | 4/2012 | Brykalski et al. |
| 2012/0104000 | A1 | 5/2012 | Lofy |
| 2012/0114512 | A1 | 5/2012 | Lofy et al. |
| 2012/0117730 | A1 | 5/2012 | Lemire et al. |
| 2012/0131748 | A1 | 5/2012 | Brykalski et al. |
| 2012/0198616 | A1 | 8/2012 | Makansi et al. |
| 2012/0227182 | A1 | 9/2012 | Brykalski et al. |
| 2012/0228904 | A1 | 9/2012 | Mouradian |
| 2012/0235444 | A1 | 9/2012 | Dilley et al. |
| 2012/0261399 | A1 | 10/2012 | Lofy |
| 2012/0319439 | A1 | 12/2012 | Lofy |
| 2013/0008181 | A1 | 1/2013 | Makansi et al. |
| 2013/0086923 | A1 | 4/2013 | Petrovski et al. |
| 2013/0097776 | A1 | 4/2013 | Brykalski et al. |
| 2013/0097777 | A1 | 4/2013 | Marquette et al. |
| 2013/0206852 | A1 | 8/2013 | Brykalski et al. |
| 2013/0239592 | A1 | 9/2013 | Lofy |
| 2013/0278075 | A1 | 10/2013 | Kurs et al. |
| 2014/0007594 | A1 | 1/2014 | Lofy |
| 2014/0026320 | A1 | 1/2014 | Marquette et al. |
| 2014/0030082 | A1 | 1/2014 | Helmenstein |
| 2014/0041396 | A1 | 2/2014 | Makansi et al. |
| 2014/0062392 | A1 | 3/2014 | Lofy et al. |
| 2014/0090513 | A1 | 4/2014 | Zhang et al. |
| 2014/0090829 | A1 | 4/2014 | Petrovski |
| 2014/0113536 | A1 | 4/2014 | Goenka et al. |
| 2014/0131343 | A1 | 5/2014 | Walsh |
| 2014/0159442 | A1 | 6/2014 | Helmenstein |
| 2014/0180493 | A1 | 6/2014 | Csonti et al. |
| 2014/0187140 | A1 | 7/2014 | Lazanja et al. |
| 2014/0194959 | A1 | 7/2014 | Fries et al. |
| 2014/0237719 | A1 | 8/2014 | Brykalski et al. |
| 2014/0250918 | A1 | 9/2014 | Lofy |
| 2014/0256244 | A1 | 9/2014 | Sakurai et al. |
| 2014/0260331 | A1 | 9/2014 | Lofy et al. |
| 2014/0305625 | A1 | 10/2014 | Petrovski |
| 2014/0310874 | A1 | 10/2014 | Brykalski et al. |
| 2014/0338366 | A1 | 11/2014 | Adldinger et al. |
| 2015/0013346 | A1 | 1/2015 | Lofy |
| 2015/0121902 | A1 | 5/2015 | Steinman |
| 2016/0053772 | A1 | 2/2016 | Lofy et al. |
| 2016/0133817 | A1 | 5/2016 | Makansi et al. |
| 2016/0152167 | A1 | 6/2016 | Kozlowski |
| 2016/0304013 | A1 | 10/2016 | Wolas et al. |
| 2017/0135490 | A1 | 5/2017 | Andrix et al. |
| 2017/0181225 | A1 | 6/2017 | Inaba et al. |
| 2017/0291467 | A1 | 10/2017 | Steinman et al. |

FOREIGN PATENT DOCUMENTS

| | | |
|---|---|---|
| DE | 201 20 516 | 4/2003 |
| DE | 20120516 | 6/2003 |
| EP | 0 411 375 | 2/1991 |
| EP | 0 411 375 | 5/1994 |
| EP | 0 730 720 | 5/2000 |
| EP | 0 730 720 B1 | 5/2000 |
| JP | 53-80603 | 7/1978 |
| JP | 53-080603 U | 7/1978 |
| JP | 54-097212 | 7/1979 |
| JP | 54-097212 U | 7/1979 |
| JP | 58-185952 | 10/1983 |
| JP | 60-12095 | 1/1985 |
| JP | 60-012095 | 1/1985 |
| JP | 61-194354 | 12/1986 |
| JP | 61-194354 U | 12/1986 |
| JP | 62-107762 | 7/1987 |
| JP | 62-191212 | 8/1987 |
| JP | 63-178548 | 11/1988 |
| JP | 64-030042 | 2/1989 |
| JP | 64-30042 | 2/1989 |
| JP | 01-172012 | 7/1989 |
| JP | 04-107656 | 9/1992 |
| JP | 05-000623 | 1/1993 |
| JP | 5-623 | 1/1993 |
| JP | 5-23235 | 2/1993 |
| JP | 05-023235 | 2/1993 |
| JP | 5-10700 | 3/1993 |
| JP | 05-010700 Y2 | 3/1993 |
| JP | 05-213056 | 8/1993 |
| JP | 05-277020 | 10/1993 |

(56) References Cited

FOREIGN PATENT DOCUMENTS

| | | |
|---|---|---|
| JP | 10-297243 | 11/1998 |
| JP | 2003-254636 | 9/2003 |
| WO | WO 02/011968 | 2/2002 |
| WO | WO 02/11968 | 2/2002 |
| WO | WO 02/053400 | 7/2002 |
| WO | WO 03/014634 | 2/2003 |
| WO | WO 03/051666 | 6/2003 |
| WO | WO 2007/142972 | 12/2007 |
| WO | WO 2008/057962 | 5/2008 |
| WO | WO 2009/036077 | 3/2009 |
| WO | WO 2010/088405 | 8/2010 |
| WO | WO 2015/085150 | 6/2015 |
| WO | WO 2015/123585 | 8/2015 |
| WO | WO 2015/191819 | 12/2015 |
| WO | WO 2016/130840 | 8/2016 |

OTHER PUBLICATIONS

Partial English language translation of JP 04-107656, 1 pg.*

U.S. Appl. No. 15/118,441, filed Aug. 11, 2016, Inaba et al., and its entire prosecution history.

Photographs and accompanying description of climate control seat assembly system components publicly disclosed as early as Jan. 1998.

Photographs and accompanying description of a component of a climate control seat assembly system sold prior to Dec. 20, 2003.

U.S. Appl. No. 15/101,854, filed Jun. 3, 2016, Wolas et al.

Lofy et al., "Thermoelectrics for Environmental Control in Automobiles", Proceeding of Twenty-First International Conference on Thermoelectrics (ICT 2002), 2002, pp. 471-476.

Photographs and accompanying description of two different components of a climate control seat assembly system sold prior to Dec. 20, 2003.

Photographs and accompanying description of a component of a climate control seat assembly system sold prior to Nov. 1, 2005.

International Preliminary Report on Patentability received in PCT Application No. PCT/US2007/012743, dated Dec. 18, 2008.

Feher, Steve, Thermoelectric Air Conditioned Variable Temperature Seat (VTS) & Effect Upon Vehicle Occupant Comfort, Vehicle Energy Efficiency, and Vehicle Environment Compatibility, SAE Technical Paper, Apr. 1993, pp. 341-349.

4 photographs of a climate controlled seat assembly and an accompanying Statement of Relevance.

International Search Report and Written Opinion, mailed Sep. 11, 2008, for PCT/USZO07/12743, the corresponding PCT application of the present U.S. Appl. No. 11/561,316.

* cited by examiner

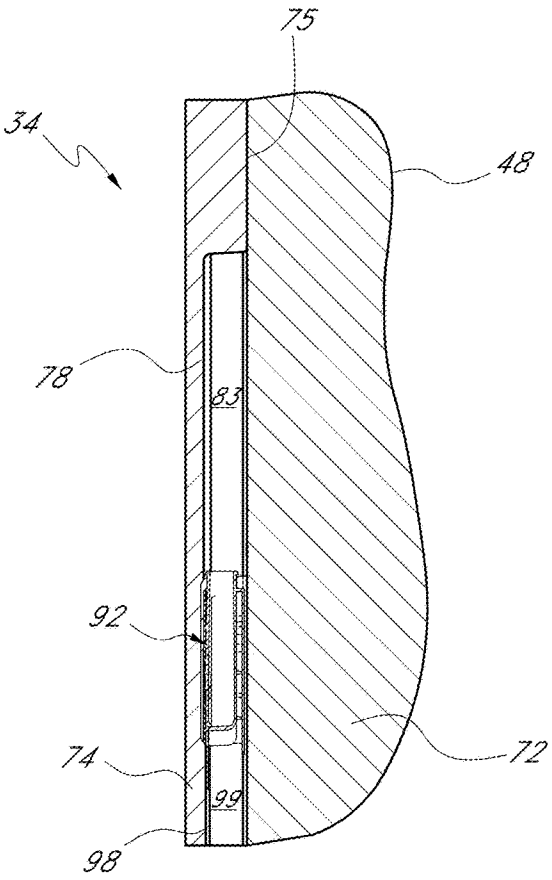
FIG.5
(Amended)

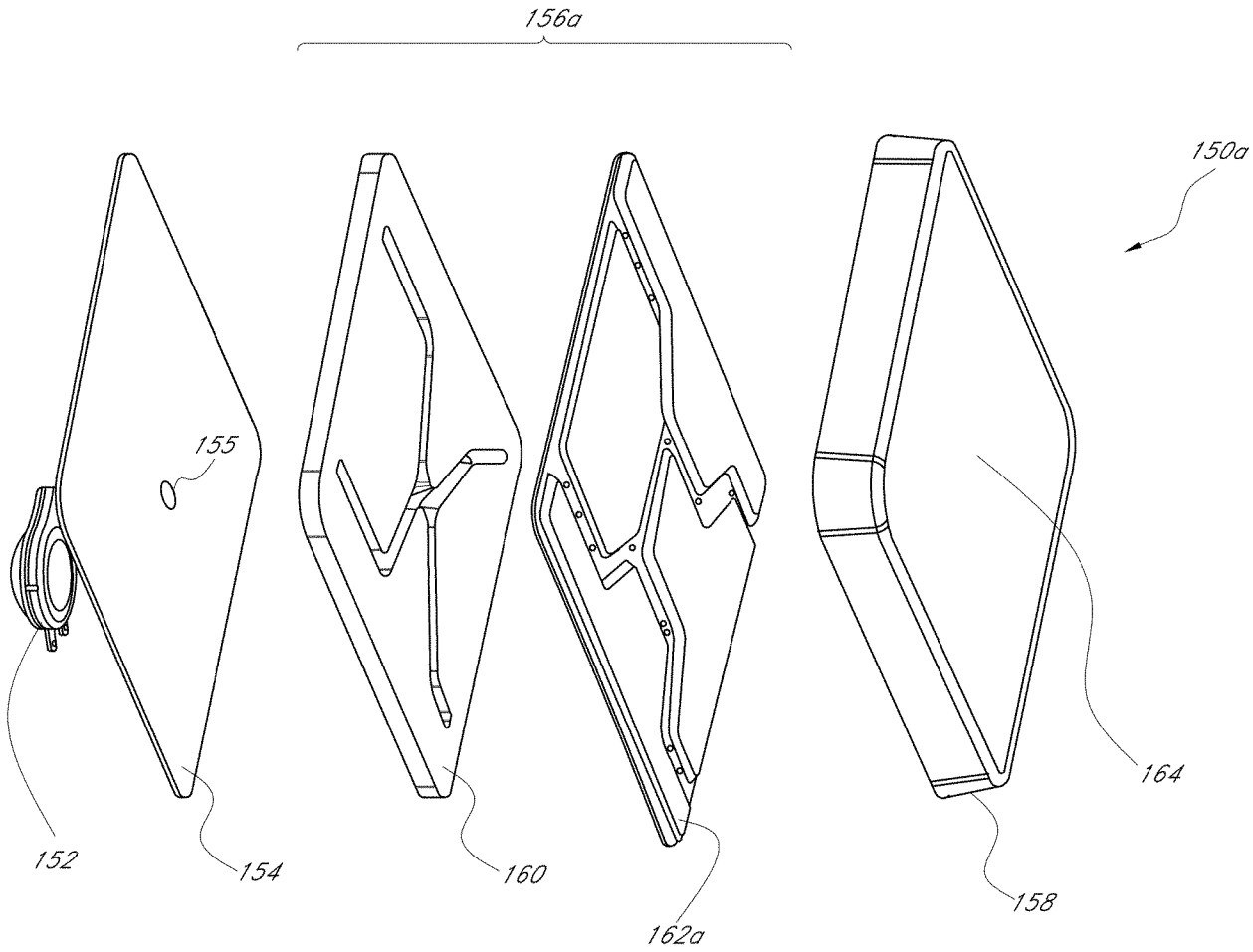
FIG. 10
(Amended)

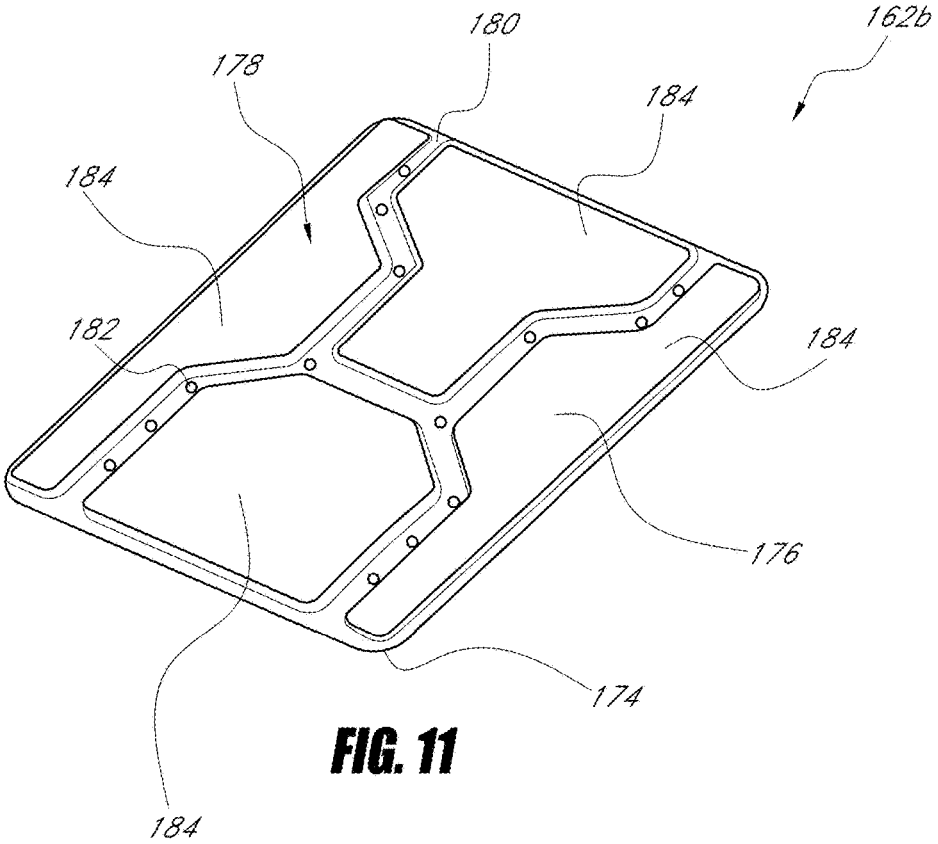
FIG. 11
(Amended)

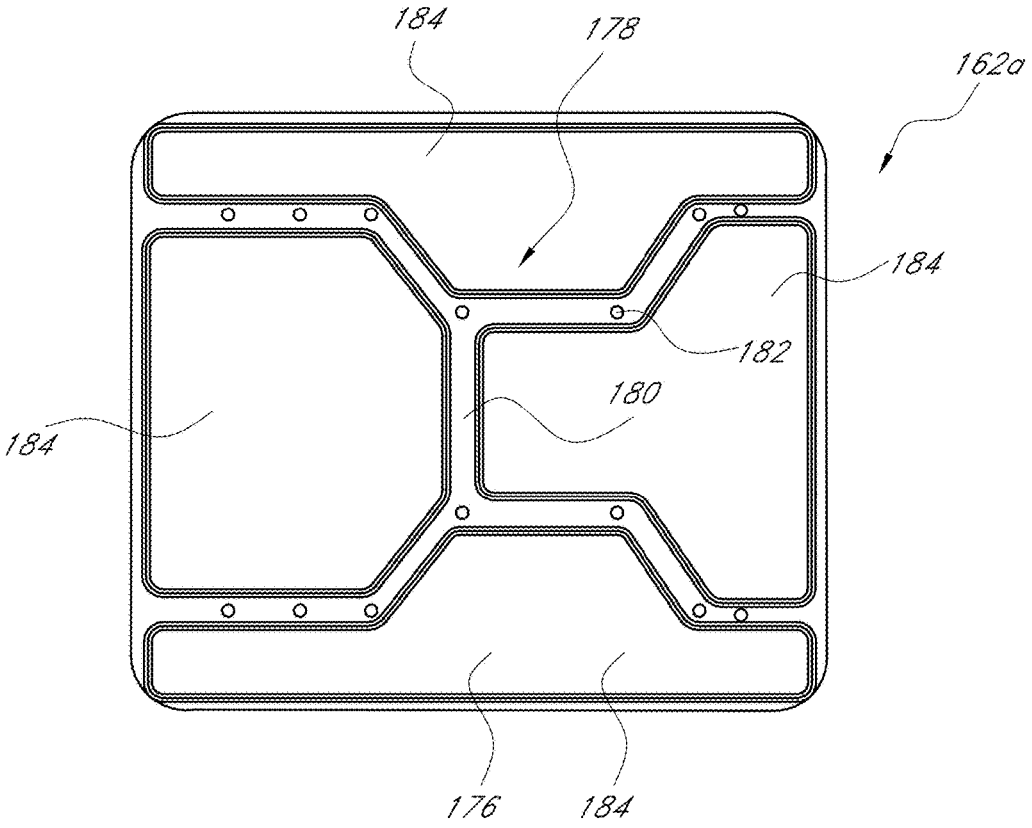
FIG. 12
(Amended)

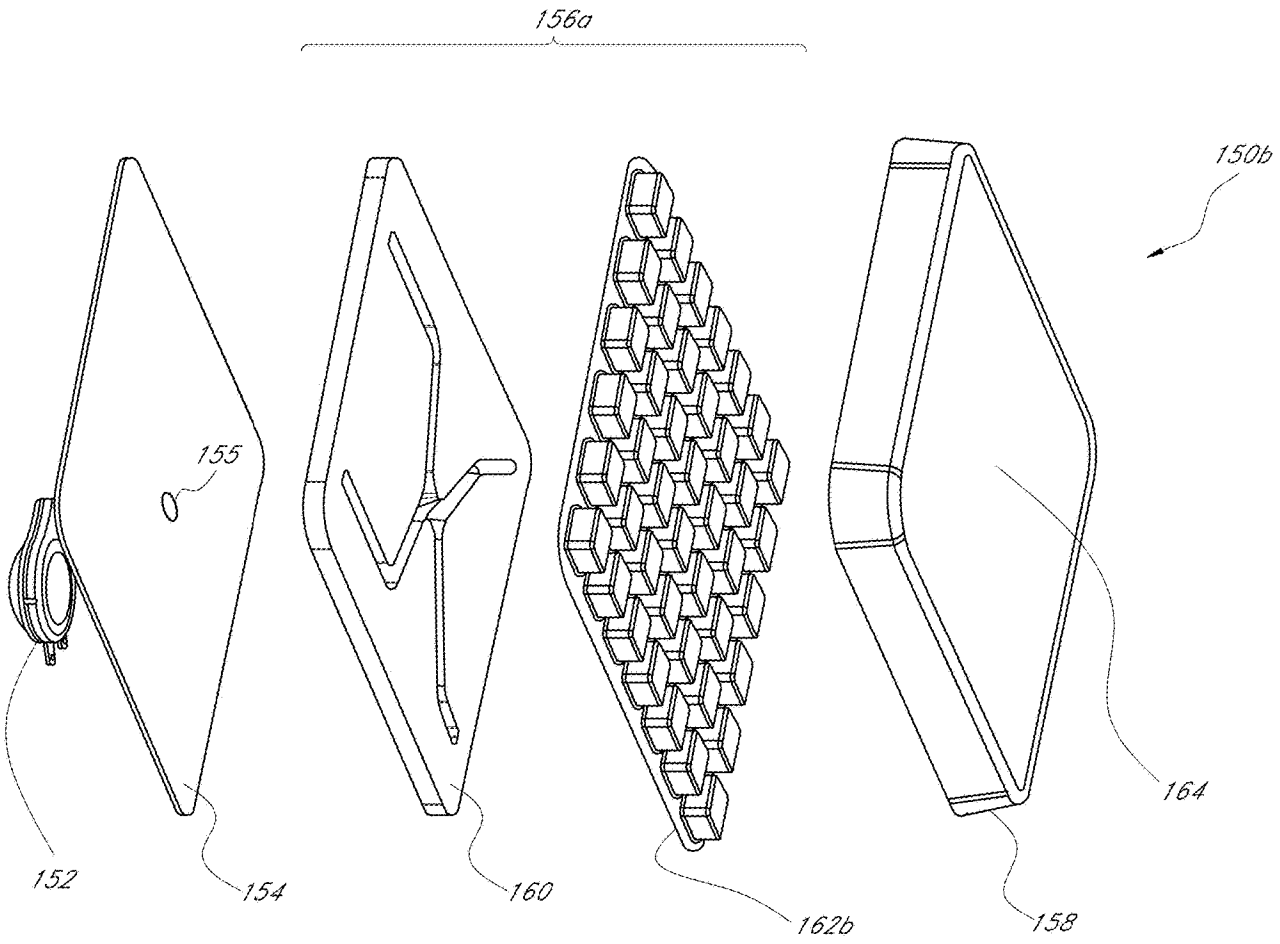
FIG. 13
(Amended)

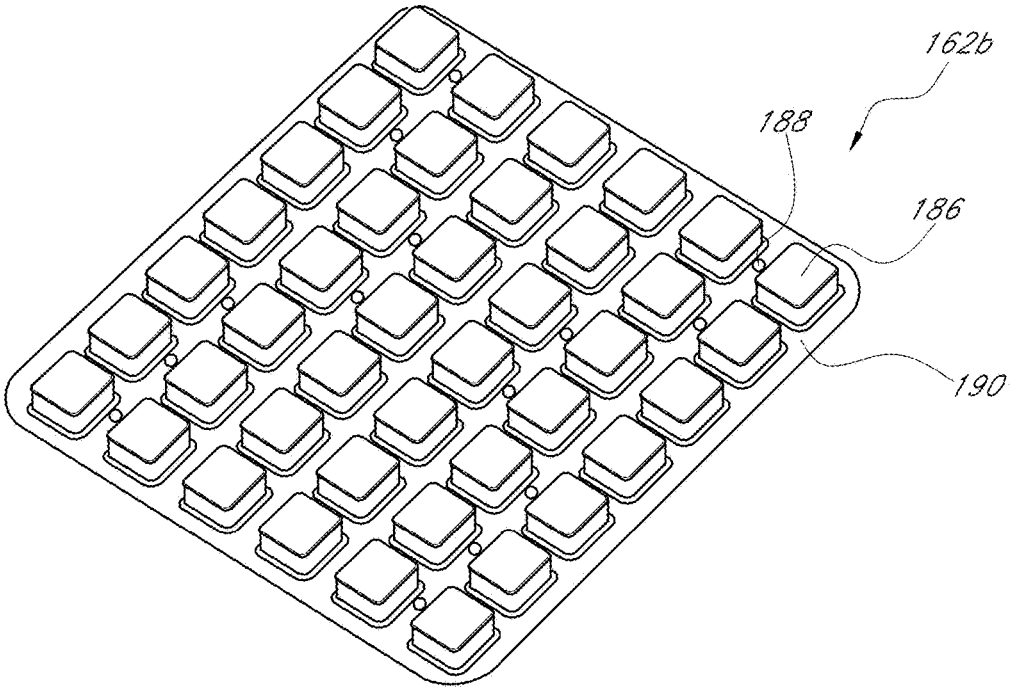
FIG. 14
(Amended)

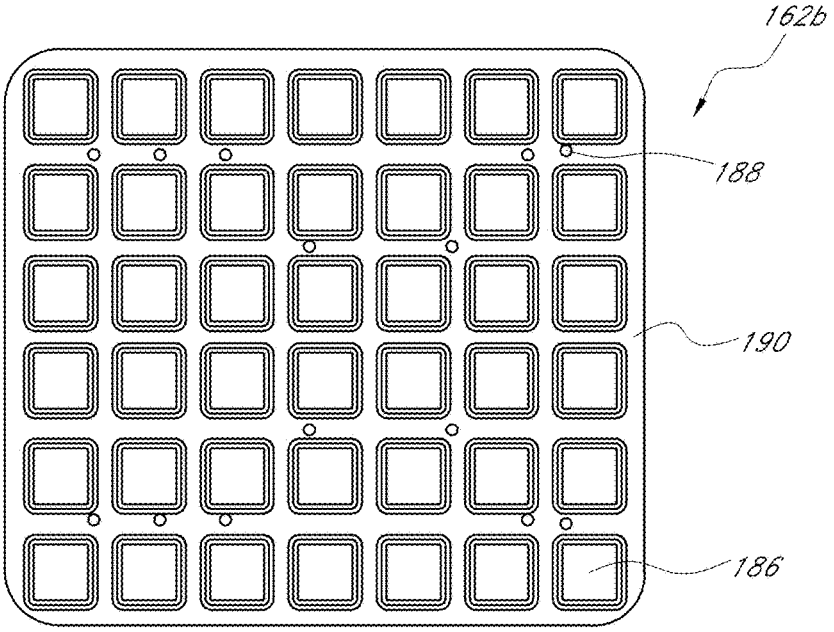
FIG. 15
(Amended)

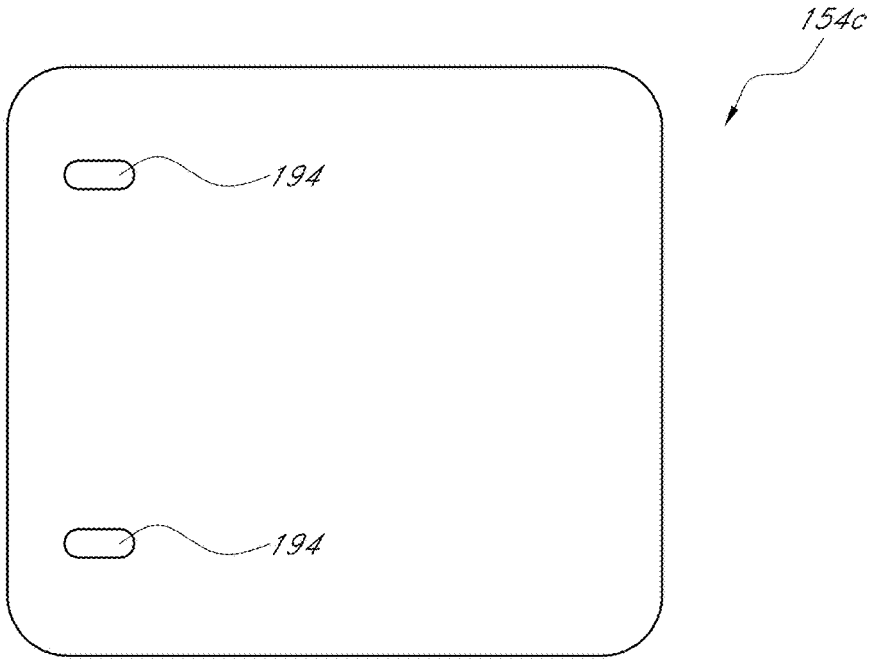
FIG. 16
(Amended)

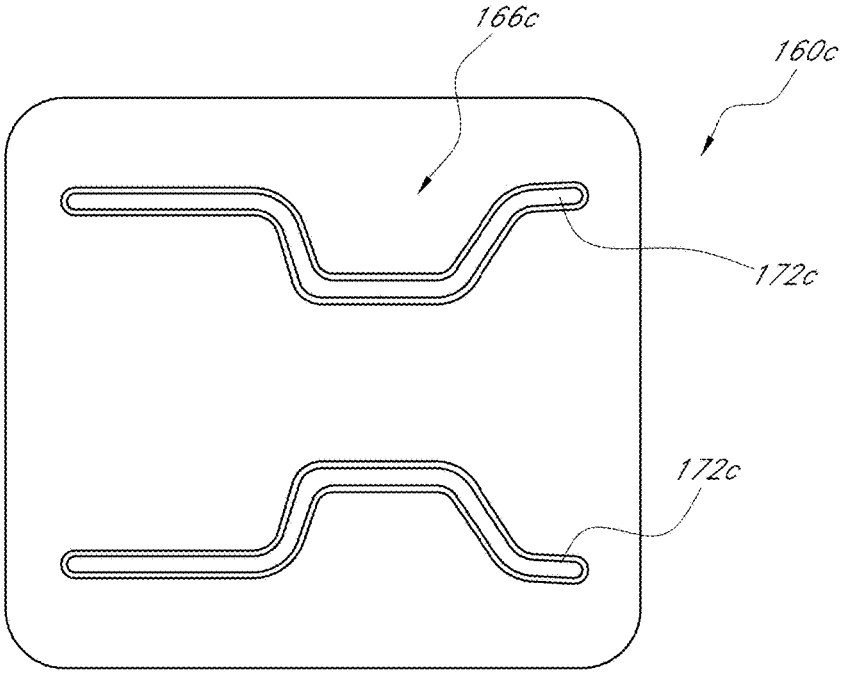
FIG.17
(Amended)

STRUCTURE BASED FLUID DISTRIBUTION SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

PRIORITY INFORMATION

This application *is a reissue of U.S. Pat. No. 8,539,624, which issued Sep. 24, 2013 from U.S. patent application Ser. No. 11/561,316, filed Nov. 17, 2006, which* claims priority to U.S. Provisional Patent Application No. 60/809,459, filed May 31, 2006, the [entirety] *entireties* of *both of* which [is] *are* hereby incorporated by reference herein.

INCORPORATION BY REFERENCE

The [entirety] *entireties* of *U.S. Pat. No. 8,539,624, filed as U.S. patent application Ser. No. 11/561,316 on Nov. 17, 2006 and issued on Sep. 24, 2013, and* U.S. Provisional Patent Application No. 60/809,459, filed May 31, 2006, [is] *are* expressly incorporated by reference herein and made a part of the present specification.

BACKGROUND OF THE INVENTION

1. Field of the Invention

This invention relates to climate control. More specifically, this invention relates to climate control of a seat.

2. Description of the Related Art

Temperature modified air for environmental control of living or working space is typically provided to relatively extensive areas, such as entire buildings, selected offices, or suites of rooms within a building. In the case of vehicles, such as automobiles, the entire vehicle is typically cooled or heated as a unit. There are many situations, however, in which more selective or restrictive air temperature modification is desirable. For example, it is often desirable to provide an individualized climate control for an occupant seat so that substantially instantaneous heating or cooling can be achieved. For example, an automotive vehicle exposed to the summer weather, where the vehicle has been parked in an unshaded area for a long period of time, can cause the vehicle seat to be very hot and uncomfortable for the occupant for some time after entering and using the vehicle, even with normal air conditioning. Furthermore, even with normal air-conditioning, on a hot day, the seat occupant's back and other pressure points may remain sweaty while seated. In the winter time, it is highly desirable to have the ability to quickly warm the seat of the occupant to facilitate the occupant's comfort, especially where the normal vehicle heater is unlikely to warm the vehicle's interior as quickly.

For such reasons, there have long been various types of individualized climate control systems for vehicle seats. Such climate control systems typically include a distribution system comprising a combination of channels and passages formed in the cushion of the seat. Climate conditioned air is supplied to these channels and passages by a climate control device. The climate conditioned air flows through the channels and passages to cool or heat the space adjacent the surface of the vehicle seat.

There are, however, problems that have been experienced with existing climate control systems for seat assemblies. For example, the distribution system is typically positioned along or near the top surface of the cushion generally adjacent to the occupant. This can compromise the comfort and/or the appearance of the seat. To solve this problem, additional components such as cover layers, additional cushioning material etc. have been added to the seat.

SUMMARY OF THE INVENTION

Accordingly, one aspect of the present invention comprises a climate controlled assembly which includes a cushion and a support member. The cushion has an outer surface comprising a first side for supporting an occupant and a second side. The first side and the second side face generally in opposite directions. At least one air passage extends from the first side to the second side of the cushion. The support member has a first side configured to provide support to the cushion and a second side. The first side and the second side of the support member face generally in opposite directions. The support member comprising at least one channel that is formed in the first side of the support member. The at least one channel defines at least part of a distribution passage that is in fluid communication with the at least one air passage.

Another aspect of the present invention comprises a method of assembling a climate controlled assembly. In the method, a cushion is formed with passages that extend from a first side of the cushion to a second side of the cushion. A support member is formed with distribution channels formed on a front face of the support member. The distribution channels are aligned with the passages in the cushion. The second side of the cushion is coupled to the front face of the support member.

Another aspect of the present invention comprises a climate controlled assembly that has a cushion and a support member. The cushion has an outer surface comprising a first side for supporting an occupant and a second side. The first side and the second side generally face in opposite directions. At least one air passage extends from the first side to the second side of the cushion. A support member has a first side configured to provide support to the cushion and a second side. The first side and the second side of the support member generally face in opposite directions. A fluid transfer device is positioned between at least a portion of the support member and at least a portion of the cushion. The assembly also includes means for distributing air from the fluid transfer device along at least a portion of the first side of the support member to the plurality of spaced apart air passages.

Another aspect of the present invention comprises a climate controlled assembly having a cushion and a support member. The cushion has an outer surface comprising a first side for supporting an occupant and a second side. The first side and the second side generally face in opposite directions. A support member has a first side configured to provide support to the cushion and a second side. The first side and the second side of the support member generally face in opposite directions. A fluid transfer device is configured to move fluid and is positioned at least partially between at least a portion of the support member and at least a portion of the cushion.

Another aspect of the present invention comprises a climate controlled assembly that includes a cushion that has an outer surface with a first side for supporting an occupant and a second side, which generally faces in an opposite direction than the first side. An air passage extends from the first side to the second side of the cushion. A support member has a first side that is configured to provide support to the cushion and a second side. The first side and the second side of the support member generally face in opposite directions. A distribution passage is in communication with the air passage and is formed at least in part by a recess formed at least in part in one of the first side of the support member and the second side of the cushion.

Another aspect of the present invention comprises a climate controlled assembly which includes a cushion that has an outer surface comprising a first side for supporting an occupant and a second side. The first side and the second side generally face in opposite directions. At least one air passage extends from the first side to the second side of the cushion. The assembly further includes a support member having a first side configured to provide support to the cushion and a second side. The first side and the second side of the support member generally face in opposite directions. The support member further comprises at least one opening that extends through the support member from the first side to the second side. The assembly further includes an intermediate member positioned between the cushion and the support member. The intermediate member comprises at least one open channel that is configured to place the at least one opening in the support member in communication with the at least one air passage in the cushion.

Further features and advantages of the present invention will become apparent to those of ordinary skill in the art in view of the detailed description of preferred embodiments which follow, when considered together with the attached drawings and claims.

BRIEF DESCRIPTION OF THE DRAWINGS

FIG. 5 is a cross-sectional view of the seat assembly of FIG. 1 taken along line 5-5 of FIG. 2.

FIG. 10 is a perspective view of an assembly of a climate controlled seat system.

FIG. 11 is a perspective view of the cushion layer of the climate controlled seat assembly of FIG. 10.

FIG. 12 is a front view of the cushion layer of the climate controlled seat system of FIG. 10.

FIG. 13 is a perspective view of an assembly of a climate controlled seat system.

FIG. 14 is a perspective view of the cushion layer of the climate controlled seat assembly of FIG. 13.

FIG. 15 is a front view of the cushion layer of the climate controlled seat assembly of FIG. 13.

FIG. 16 is an embodiment of a frame of the climate controlled seat system of FIG. 7.

FIG. 17 is an embodiment of an intermediate layer of the climate controlled seat system of FIG. 7.

DETAILED DESCRIPTION OF THE PREFERRED EMBODIMENTS

Figure 1:
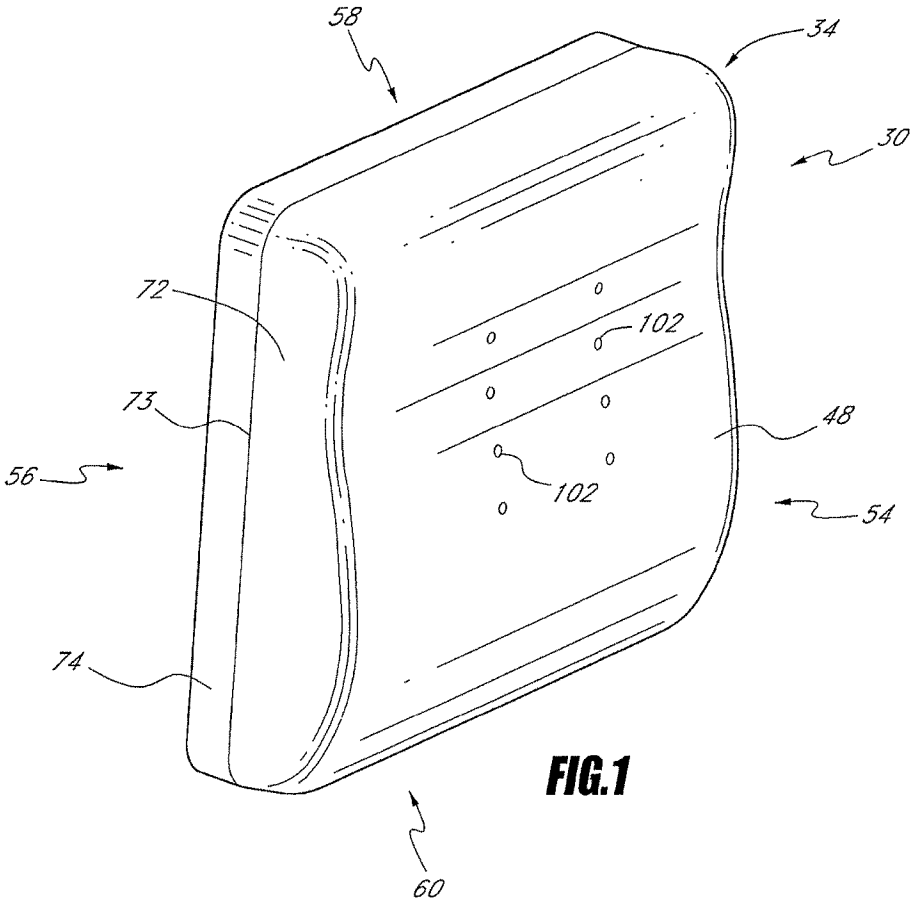
FIG. 1 is a perspective view of a back portion of a seat assembly, which includes a climate control system that is configured in accordance with a preferred embodiment of the present invention.
Figure 2:
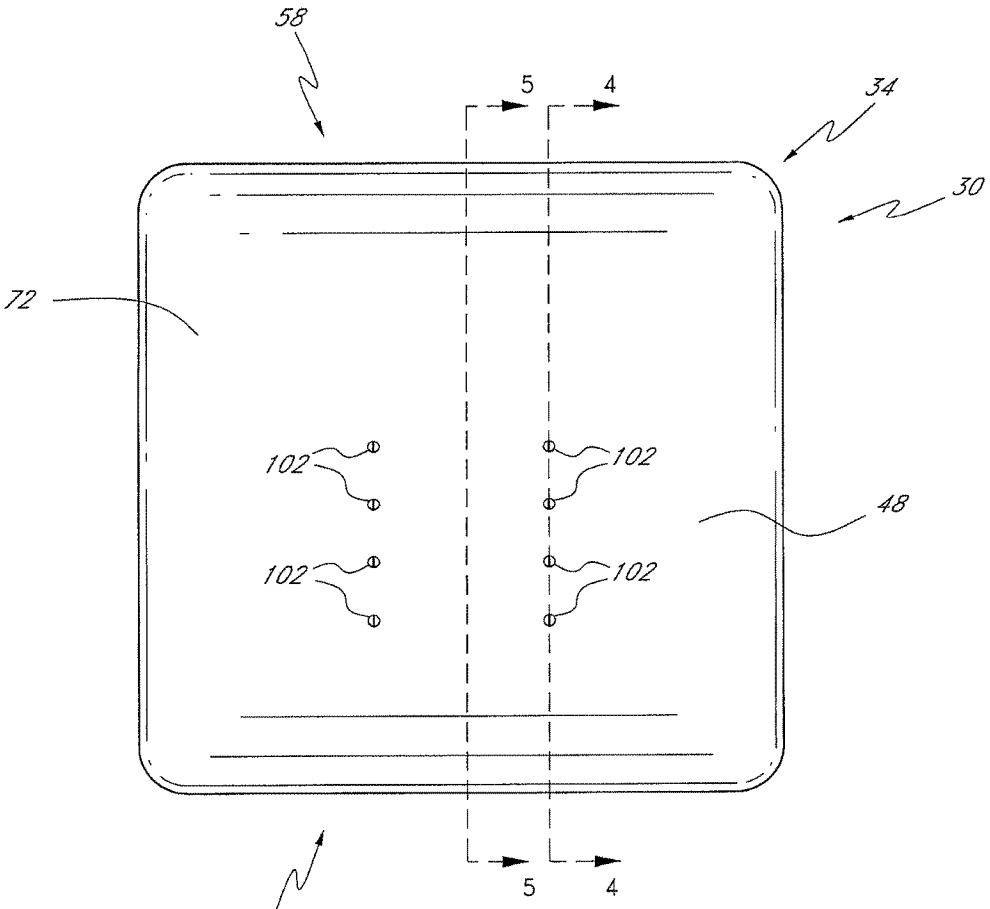
FIG. 2 is a front view of the seat assembly of FIG. 1.

FIGS. 1 and 2 are front perspective and front views of an embodiment of a climate controlled seat assembly 30. As shown, the seat assembly 30 comprises a backrest 34, which can be coupled and/or used in combination with a seat portion (not shown) to form a seat. The seat assembly 30 also includes a climate control system 36, which will be described in more detail below with reference to FIGS. 3-6.

When an occupant sits in the seat assembly 30, the occupant's seat is located on the seat portion and the occupant's back contacts a front surface 48 of the backrest portion 34. The backrest 34 and the seat portion cooperate to support the occupant in a sitting position. The seat assembly 30 can be configured and sized to accommodate occupants of various size and weight.

In the illustrated embodiment, the seat assembly 30 is similar to a standard automotive seat. However, it should be appreciated that certain features and aspects of the seat assembly 30 described herein may also be used in a variety of other applications and environments. For example, certain features and aspects of the seat assembly 30 may be adapted for use in other vehicles, such as, for example, an airplane, a boat, wheelchairs, or the like. Further, certain features and aspects of the seat assembly 30 may also be adapted for use in stationary environments, such as, for example, a chair, a sofa, a theater seat, and an office seat that is used in a place of business and/or residence. In addition, certain features and aspects of the seat assembly 30 can be adapted for use in devices that do not support a person in a seated position, such as, for example, beds.

With continued reference to FIGS. 1 and 2, the backrest 34 has a front side 54, a rear side 56, a top side 58 and a bottom side 60. Although not illustrated, the backrest 34 can include a pair of sides that extend between the top side 58 and bottom side 60 for providing lateral support to the occupant of the seat assembly 30.

As shown, the backrest 34 is generally formed by a cushion 72, which is covered with an appropriate covering material (not shown), such as, for example, upholstery, vinyl or leather. The cushion 72 is typically supported on a frame or support member 74. In some embodiments, springs may be positioned between the frame 74 and the cushion 72. The frame 74 provides the seat assembly 30 with structural support while the cushion 72 provides a soft seating surface. The covering material, in turn, provides an aesthetic appearance and soft feel to the surface of the seat assembly 30. The cushion 72 also has a rear side 73, which is generally opposite the front side [48] *54* of the cushion 72 and adjacent to the frame 74.

The cushion 72 can be a typical automotive seat cushion foam or other types of materials with suitable characteristics for providing support to an occupant. Such materials include, but are not limited to, closed or open-celled foam.

Figure 3:
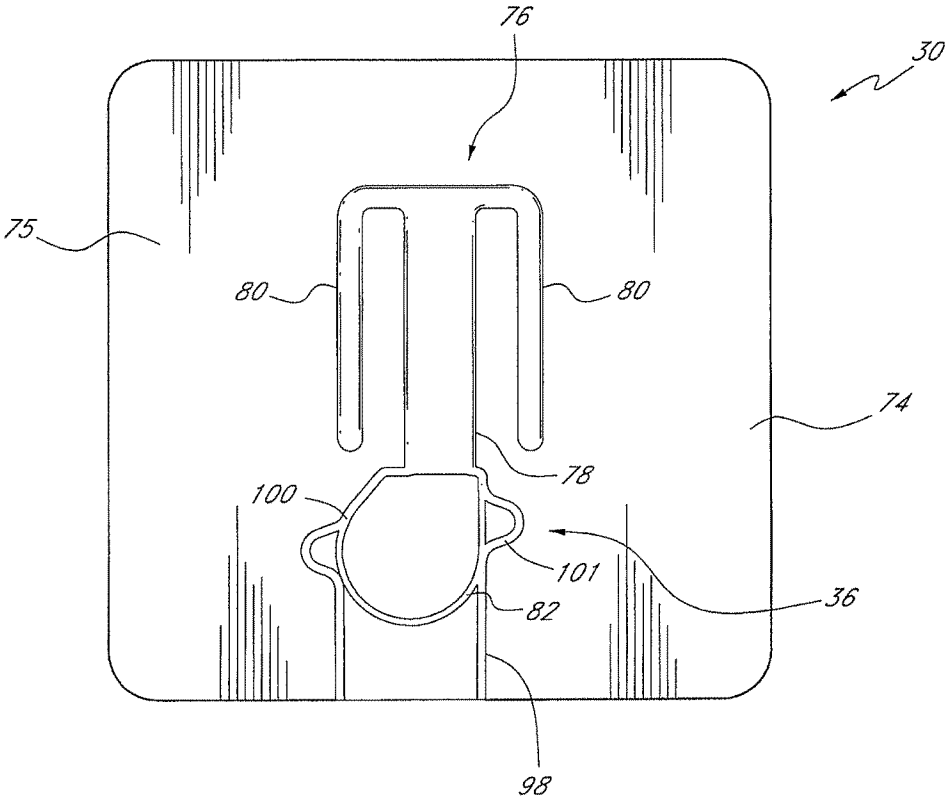
FIG. 3 is a front view of the seat assembly of FIG. 1 with a cushion removed.

FIG. 3 is a front view of the seat assembly 30 of FIGS. 1 and 2 with the cushion 72 removed to illustrate the exposed front face 75 of the frame 74. As shown, the frame 74 of the backrest 34 of the seat assembly 30 forms, at least in part, a portion a backrest fluid distribution system 76. The distribution system 76 comprises an inlet channel or recess 78, which can be formed in the front face 75 of the frame 74. In the illustrated embodiment, the inlet channel 78 comprises a generally u-shaped channel or recess. In modified embodiments, the inlet channel 78 can have a different shape (e.g., v-shaped, or semi-circular).

With continued reference to FIG. 3, the distribution system 76 also includes at least one, and often, a plurality of distribution channels or recesses 80, which extend from the inlet channel 78. In the illustrated embodiment, the inlet channel 78 extends in a generally vertical direction along the front face 75 of the frame 74. The distribution system 76 includes a pair of distribution channels 80, which extend horizontally in opposite directions from the inlet channel 78. The distribution channels 80 then turn approximately 90 degrees and extend in a generally downwardly direction generally parallel to the inlet channel 78. However, it should be appreciated that the illustrated shape, orientation and number of inlet and distribution channels 78, 80 is one example that can be used to distribute a fluid along the frame 74. Modified embodiments of the present invention can utilize different numbers, shapes, and orientations of the inlet and distribution channels 78, 80. In addition, the inlet and distribution channels 78, 80 can be combined or subdivided.

As shown in FIG. 3, the inlet channel 78 can be in communication with a recess 82 for a fluid module 92 (not shown in FIG. 3). The recess 82 can be configured such that when the fluid module 92 is positioned within the recess 82 an outlet of the fluid module is in communication with the inlet passage 78. The fluid module also includes an inlet, which is in communication with a fluid module inlet channel 98, which extends from the recess 82. The recess 82 can include recessed flanged portions 101 which are configured to receive mounting flanges coupled to the fluid module 92. In this manner, the fluid module 92 can be positioned within the recess 82 such that its outlet is in fluid communication with the inlet channel 78 and its inlet is in fluid communication with the fluid module inlet channel 98.

As will be explained below, the fluid module 92 can be configured to provide conditioned air (and/or to remove air in some embodiments) to the distribution systems 76. In this manner, the fluid module 92 provides a fluid flow to either warm or cool the front surface 48 of the backrest 34 as will be explained below. In such embodiments, the fluid module 92 can include heating and/or cooling elements. In modified embodiments, the fluid module 92 can be configured to provide unconditioned (e.g., ambient) air to the front surface of the backrest 34. In such an embodiment, the fluid module can include a pumping element (e.g., an axial or radial fan).

Figure 4:
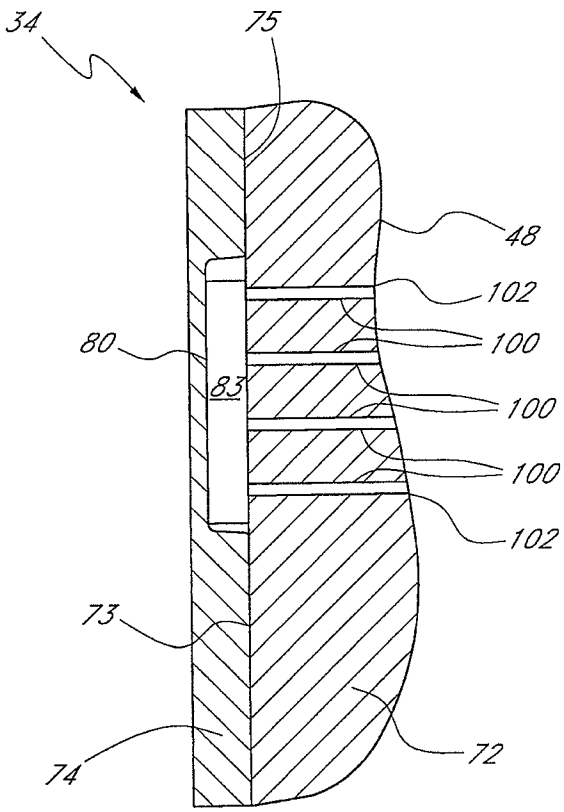
FIG. 4 is a cross-sectional view of the seat assembly of FIG. 1 taken along line 4-4 of FIG. 2.

With reference to FIGS. 4-5, the front surface 75 of the frame 74 can be covered by the cushion 72 to define distribution passages 83 for transporting air from the fluid module 92 along the front surface 75 of the frame 74. The cushion 72 and the fluid module inlet channel 98 define, in turn, a fluid module inlet passage 99 (see FIG. 5) for transporting air from outside the seat assembly 30 to the fluid module 92.

As shown in FIG. 4, a plurality of orifices 100 can extend through the cushion. 72 for delivering air to and/or from the distribution passages 83. Each orifice 100 includes an opening 102 on the front surface 48 of the cushion 72 (see also, FIGS. 1 and 2) and communications with a distribution passage. In this manner, air can be either delivered from the distribution passages 83 to the front surface 48 of the cushion 72 and/or air can be removed from the front surface 48 of the cushion 72 and be withdrawn into the distribution passages 83. In the illustrated embodiment, the orifices 100 communicate with the distribution channels 80 but in modified embodiments the orifices 100 can communicate, in addition to or alternatively, with the inlet channel 78.

As mentioned above, the cushion 72 may be formed from a typical cushion material, such as, for example, an open or closed cell foam or combination thereof. In one embodiment, the cushion 72 is made of foam that is pre-molded to form the orifices and/or the channels 80. In another embodiment, the orifices [80] *100* may be formed by removing (e.g., cutting or boring) foam out of the seat cushion 72. The cushion 72 can be coupled to the frame 74 in a variety of manners, such as, for example, through adhesives, tie-downs, etc. Preferably, the cushion 72 is coupled to the frame in a manner such that the distribution passages are substantially sealed with respect to air flow. In modified embodiments, an intermediate member (e.g., a sealing pad, sealant and/or coating) can be placed between the cushion 72 and the frame 74 to form a part of the distribution passages 83. In addition to or in the alternative, an intermediate member can be placed within and/or along the channels 78, 80 in the frame 74. Such an intermediate member can be advantageous if the frame 74 is made of an air permeable material.

In certain embodiments, a distribution layer (not shown) can be disposed between the cushion 72 and the seat covering. The distribution layer can be configured to spread the air flowing through the openings 102 along bottom surface of the covering. To permit airflow between the distribution layer and the spaces proximal to the front surface 48 of the backrest 34, the covering may be formed from an air-permeable material. For example, in one embodiment, the covering comprises an air-permeable fabric made of natural and/or synthetic fibers. In another embodiment, the covering is formed from a leather, or leather-like material that is provided with small openings or apertures. In certain embodiments, the distribution layer can comprise a fibrous or honeycomb material.

The climate control seat assembly 30 and distribution system 76 has been described with reference to a backrest 30. However, as mentioned above, it is anticipated that the certain features of the climate control assembly 30 and distribution system 76 can be applied to a seat portion of a seat assembly 30. In addition, it is anticipated that certain features and features of the distribution system 76 can be applied to side panels of a seat assembly 30. Thus, for example, with respect to an embodiment for a seat portion, the exposed front face 75 of the frame 74 can correspond to a top face of a frame for the seat portion. In a similar manner, the rear side 73 of the seat cushion can correspond to a bottom side of a cushion for the seat portion.

As mentioned above, the frame 74 provides support for the cushion 72. In addition, in the illustrated embodiment, the frame 74 advantageously forms and/or provides space for at least part of the distribution system 76. This arrangement is advantageous because it positions the distribution system 76 further from the front surface 48 of the backrest 34. This improves the overall seat appearance and comfort. In addition, in the prior art, when the distribution system is positioned near on the front surface of the seat, additional components (e.g., inserts, pads, distribution layers, etc.), are often used in order to improve the comfort and/or appearance of the seat. Such components are not required with the seat assembly described above. In addition, the frame 74 in the illustrated embodiment can be used to mount and/or support the fluid module 92 and/or other components of the fluid distribution system 76. For example, in the illustrate embodiment, recessed flanged portions 101 can be provided in the frame 74 for supporting corresponding flanged portions on the fluid module 92. This arrangement of positioning the fluid module 92 between at least a portion of the cushion 72 and at least a portion of the frame 74 also conserves space and improves the appearance of the seat assembly 30.

The frame 74 can be formed from a variety of materials given the goal of providing a distribution system 76 as described above. For example, in one embodiment, the frame 74 can be formed from foam or plastic (or a combination thereof) that is molded or otherwise shaped to form the distribution system 76 described above. In a modified embodiment, the frame can comprise a metallic material (e.g., steel) which has been stamped or otherwise formed the channels and recesses described above. In another embodiment, a combination of materials (e.g., metallic, foam, and/or plastic) is used to form the frame 74. In general, a foam or plastic frame 74 is preferred because it provides a lower thermal mass as compared to a metallic frame.

Given the goal of distributing air through the cushion 72 and to the front surface 48 of the seat assembly 30, those of skill in the art will recognize that the distribution system 76 can be modified in several different manners. For example, as mentioned above, the shape and/or number of channels 78, 80, 98 can be modified. In other embodiments, the orifices 100 can be replaced with porous and/or air permeable portions of the cushion [76] *72* which are in communication with the distribution system 76.

In yet another embodiment, the channels and/or recesses can also or in the alternative be formed in the rear surface 73 of the cushion 72. In such an embodiment, the fluid module 92 can be positioned within a recess formed in the rear surface 73 of the cushion 72. The channels and/or recesses described above can also be formed in the rear surface 73 of the cushion 72. Such channels and/or recesses can replace and/or be used in combination with the channels 78, 80, 98 described above. Thus, in such embodiments, the fluid module 92 and/or the channels and recesses can also be positioned between at least a portion of the cushion 72 and at least a portion of the frame 74.

In another embodiment, the fluid module 92 can be positioned within a recess or channel in the rear surface 73 of the cushion 72 and/or the front surface 75 of the frame while one or more distribution passages extend along the front surface 48 of the cushion. In such an embodiments, the distribution passages can be arranged as described in U.S. Patent Publication 2005-0264086, published Dec. 12, 2005, the entirety of which is hereby incorporated by reference herein. In such an embodiment, the system can be used without or without the inserts described in U.S. Patent Publication 2005-0264086. In certain embodiments, the thermal module inlet passage 99 can extend between the cushion 72 and frame 74 as described above and/or an inlet passage can extend through a portion of the frame 74.

In other embodiments, the distribution passages 93 can be positioned between the cushion 72 and the frame 74 while the fluid module 92 is not positioned between the frame 74 and the cushion 72. For example, the fluid module 92 can be positioned on a rear side of the frame 74 and connected to the distribution passages 83 through a passage formed in the frame 74. In a modified embodiment, the fluid module 92 can be in communication with the thermal module inlet passage 99 and positioned below the backrest 34.

Figure 6:
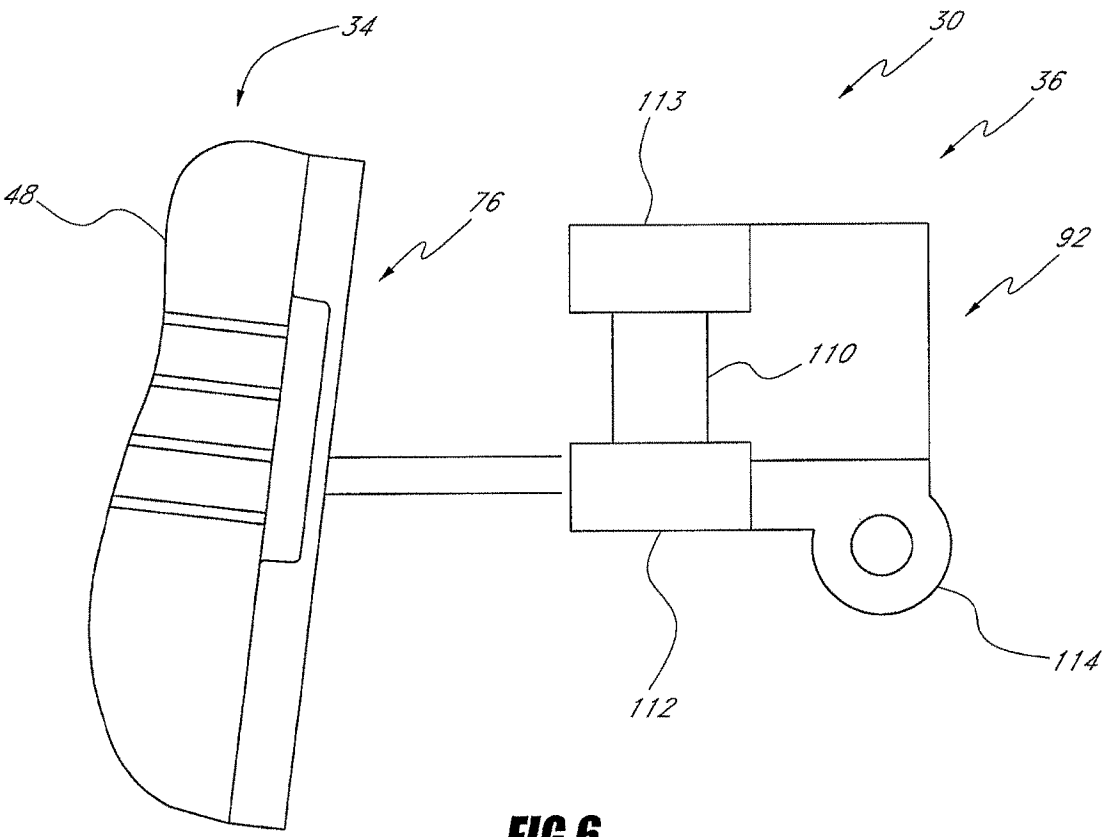
FIG. 6 is a schematic illustration of the seat assembly and climate control system of FIG. 1.

FIG. 6 is a schematic illustration of the climate control system 36 described above. Specifically, this Figure schematically illustrates the fluid module 92 and the distribution system 76 in the backrest 34. As mentioned above, the fluid module 92 can provide fluid flow to either warm or cool the front surface 48 of the backrest 34. Specifically, the climate control apparatus 36 preferably provides conditioned air that is either heated or cooled relative to the temperature of the front surface 48 of the backrest [32] *34*. In this illustrate, the fluid module 92 shown positioned outside of the frame 74 and cushion 72 according to the embodiment described in the previous paragraph.

In the illustrated embodiment, the fluid module 92 preferably includes a thermoelectric device 110 for temperature conditioning (i.e. selectively healing or cooling) the fluid flowing through the device 110. A preferred thermoelectric device 110 is a Peltier thermoelectric module, which is well known in the art. The illustrated fluid module 92 preferably also includes a main heat exchanger 112 for transferring or removing thermal energy from the fluid flowing through the module 92 and to the distribution systems 76. The module 92 also preferably includes a secondary heat exchanger 113 that extends from the thermoelectric device 110 generally opposite the main heat exchanger 112. A pumping device 114 is preferably associated with each fluid module 92 for directing fluid over the main and/or waste heat exchangers 112, 113. The pumping device 114 can comprise an electrical fan or blower, such as, for example, an axial blower and/or radial fan. In the illustrated embodiment, a single pumping device 114 can be used for both the main and waste heat exchanges 112, 113. However, it is anticipated that separate pumping devices may be associated with the secondary and heat exchangers 112, 113.

It should be appreciated that the fluid module 92 described above represents only one exemplary embodiment of a device that may be used to condition the air supplied to the distribution system 76. Any of a variety of differently configured fluid modules may be used to provide conditioned air. Other examples of fluid modules that may be used are described in U.S. Pat. Nos. 6,223,539, 6,119,463, 5,524,439 or 5,626,021, which are hereby incorporated by reference in their entirety. Another example of such a fluid module is currently sold under the trademark Micro-Thermal Module™ by Amerigon, Inc. In another example, the fluid module may comprise a pump device without a thermoelectric device for thermally conditioning the air. In such an embodiment, the pumping device may be used to remove or supply air to the distribution system 76. In yet another embodiment, the fluid module 92 can share one or more components (e.g., pumping devices, thermoelectric devices, etc.) with the vehicles general climate control system.

In operation, fluid in the form of air can be delivered from the fluid module 92, to the distribution system 76. As described above, the air flows through the passages 83, into the orifices 100 and through the covering. In this manner, conditioned air can be provided to the front surface 48 of the backrest 34.

In a modified embodiment, air from the front surface 48 can be drawn through the covering into the orifices 100. The air then can flow through the distribution passages 83. In this manner, the climate control system 36 can provide suction so that air near the surface of the seat assembly 30 is removed.

Figure 7:
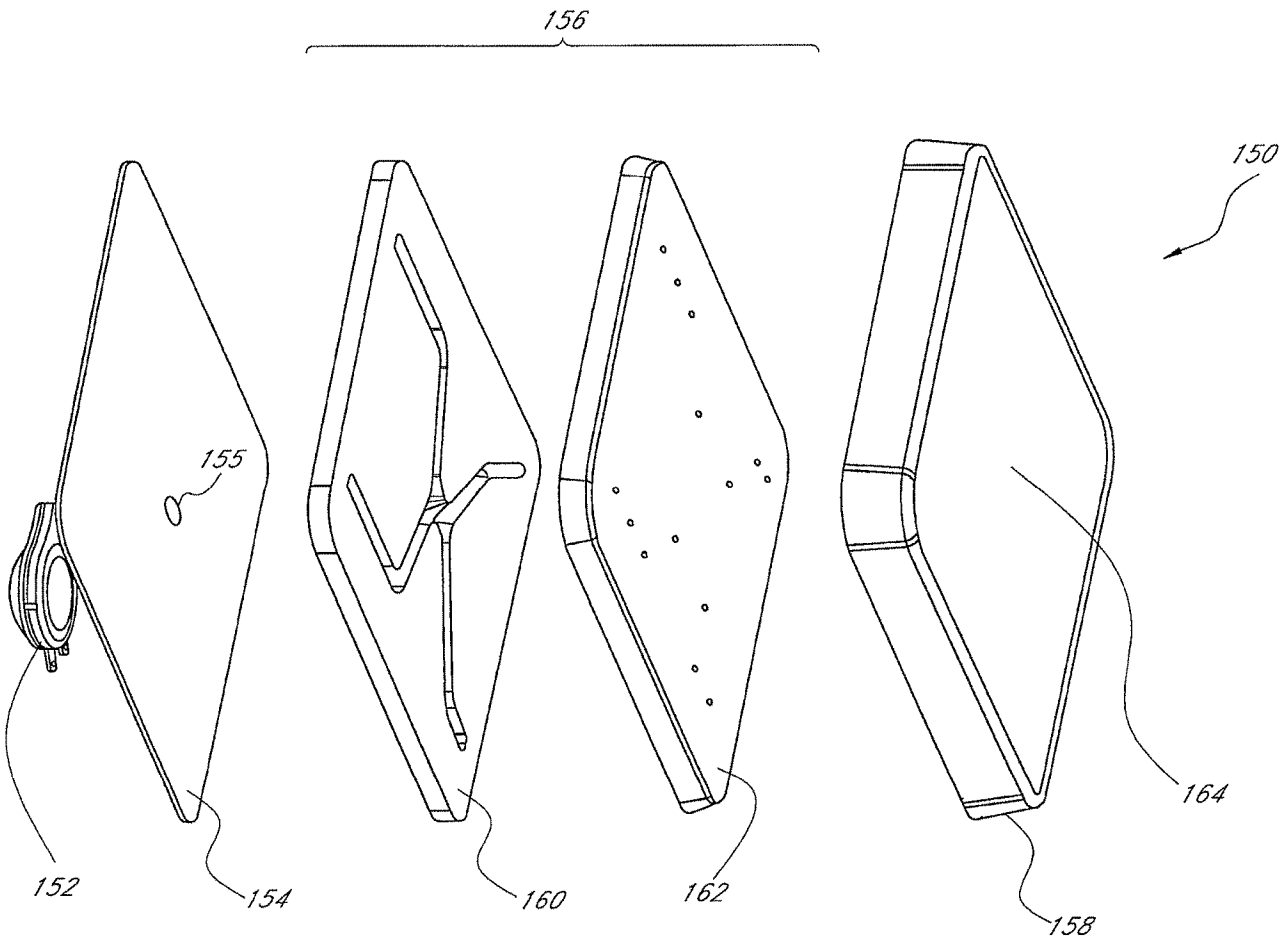
FIG. 7 is a perspective view of an assembly of a climate controlled seat system.

FIG. 7 illustrates a perspective view of an assembly of a climate controlled seat assembly 150. The climate controlled seat assembly 150 comprises a back rest which can be coupled and/or used in combination with a seat portion (not shown) to form a seat which can be similar to previous embodiments as described in FIGS. 1-6.

In the illustrated embodiment, the seat assembly 150 generally includes a climate controlled system 152 which can be substantially similar to the climate control system 36 of FIG. 6, a frame 154, and a cushion 156. The seat assembly 150 further includes a seat cover 158. The frame 154 provides the seat assembly 150 with structural support while the cushion 156 provides a soft surface for an occupant. The cover 158, in turn, provides an aesthetic appearance and soft feel to the surface of the seat assembly 150. The seat cushion 156 further includes an intermediate layer 160 and a cushion layer 162 which will be discussed in greater detail below.

With continued reference to FIG. 7, the frame 154 is preferably a rigid and substantially planar structure with a centrally located passageway 155 which is configured to maintain communication between the climate control system 152 and the cushion 156. The frame 154 is preferably sufficiently rigid or semi rigid so as to structurally support the seat assembly 150.

The intermediate layer 160 of the cushion 156 is configured to distribute air from the climate controlled system 152 evenly throughout the cushion layer 162. The cushion layer 162 inturn, is configured to distribute the air to a front surface 164 of the seat assembly 150. From the cushion layer 162, the air preferably passes through the seat cover 158 to the front surface 164. While the air is being distributed throughout the front surface 164, an occupant is preferably in contact with the seat assembly 150 at the front surface 164 of the seat cover 158.

Figure 8:
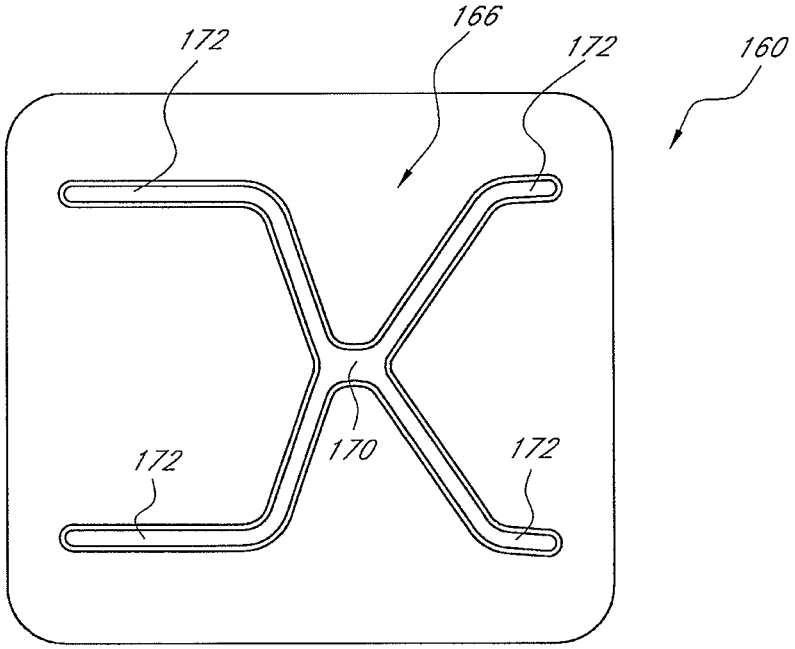
FIG. 8 is a front view of an intermediate layer of the climate controlled seat system of FIG. 7.

With reference to FIG. 8, the intermediate layer 160 of the cushion 156 preferably comprises a channel system 166. The channel system 166 preferably passes through a thickness of the intermediate layer 160. In one embodiment, the intermediate layer 160 is made of material that is pre-molded to form a channel system 166. In another embodiment, the channel system 166 may be formed by removing (e.g., cutting or boring) foam out of the intermediate layer 160. The channel system 166 includes a central entrance portion 170 and four distribution channels 172. The distribution channels 172 preferably extend from the central portion 170 and extend outwards towards distal ends of the intermediate layer 160. The channel system 166 loosely resembles an X-shape that extends from the corners of the intermediate layer 160 and crosses at the central portion 170. The channel preferably passes through the layer 160 completely forming open channels that allow air from the climate controlled system 152 to flow evenly throughout the distribution channels 172. As will be appreciated by one skilled in the art, any suitable shape of the channel system 166 can be utilized in the intermediate layer 160. Such alternative shapes may include an H-shape, a Y-shape, or simply a large rectangle that occupies a majority of the intermediate layer 160.

Preferably, a cross-sectional shape of the distribution channels 172 is generally rectangular. However, the cross-section of the channels 172 can be modified to accommodate any desired flow characteristics or optimal hydraulic shapes such as a V-shape or inverted V-shape. The intermediate layer 160 is preferably formed from typical automotive seat cushion foam. However, the intermediate layer 160 can also be constructed from other types of materials with suitable characteristics for providing support to an occupant and for holding the shape of the channel system 166. For example, certain preferred materials may include but are not limited to closed or open celled foam. In the embodiment shown in FIG. 7-9 it may be also suitable to make the intermediate layer 160 out of a rigid material such as injection molded plastic or plywood.

Figure 9:
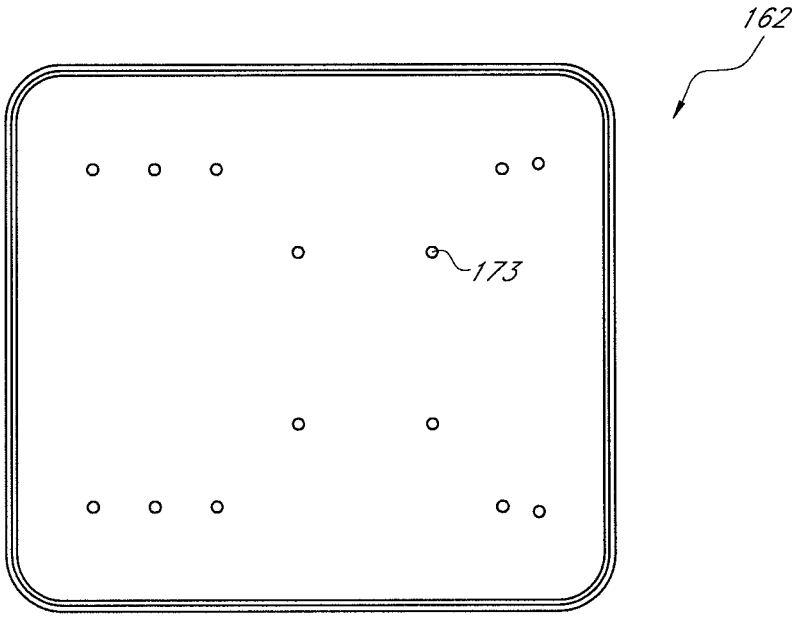
FIG. 9 is a front view of a cushion layer of the climate controlled seat system of FIG. 7.

FIG. 9 illustrates a top view of the cushion layer 162. The cushion layer 162 preferably has a plurality of apertures 173 which pass through a thickness of the cushion layer 162. In the illustrated embodiment, the cushion layer 162 includes 14 apertures which closely follow the path of the channel system 166 of the intermediate layer 160. This pattern allows air flowing through the distribution channels 172 to be evenly distributed to the apertures 173. The air can then pass from the distribution channels 172 through the apertures 173 and proceed toward the front surface 164.

In one embodiment, layer 162 is made of material that is pre-molded to form the apertures 173. In another embodiment, the apertures 173 may be formed by removing (e.g., cutting or boring) foam out of the cushion layer 162. It will also be appreciated by one skilled in the art that the apertures 173 may comprise any number of apertures in any configuration to optimize hydraulic characteristics of air transfer. For example, there may be a greater or lesser number of apertures of varying size and shape in the cushion layer 162.

Similar to the intermediate layer 160 of FIG. 8, the cushion layer 162 of FIG. 9 is preferably constructed from typical automotive seat cushion foam. However, once again, other types of materials with suitable characteristics may be used. For example, certain preferred materials may include but are not limited to close or open cell foam. It can also be appreciated by one skilled in the art that the intermediate layer 160 of FIG. 8 and the cushion layer 162 of FIG. 9 may be made of a semi-rigid or rigid material. Such a configuration may preferably be used alternatingly with having one of the layers 160 or 162 rigid with the other layer a soft cushion.

With returning reference to FIG. 7, the climate controlled seat assembly 150 includes a seat cover 158 which preferably covers at least a portion of the layers 162 and 160. The material is preferably an air permeable fabric permitting air flow from the cushion layer 162 to front surface 164. For example, in one embodiment, the seat cover 158 comprises an air-permeable fabric made of natural and/or synthetic fibers. In another embodiment, the covering is formed from a leather, or leather-like material that is provided with small openings or apertures.

FIG. 10 illustrates another embodiment of a climate controlled seat assembly [150] *150a*. Similar to the embodiment illustrated in FIG. 7, the embodiment illustrated in FIG. 10 includes a climate controlled system 152, a frame 154, layers 160 and 162 and a seat cover 158. The frame 154, the intermediate layer 160, the cover 158, and the climate controlled system 152 are substantially similar to the climate controlled seat assembly embodiment of FIG. 7. The cushion layer [162] *162a* of FIG. 10 does present some differences from the cushion layer 162 shown in FIGS. 7-9 as will be described below.

The cushion layer [162] *162a* shown in FIGS. 11 and 12 is preferably a gel-filled layer. Although it is preferable that the layer be gel-filled, it may be filled with any suitable fluid or particulate that may produce a comfortable feel to an occupant. The cushion layer [162] *162a* preferably comprises a lower layer 174 and an upper layer 176. The lower layer 174 and the upper layer 176 are preferably fused together along outer edges to form gel pockets 184 in between the two layers 174 and 176. The upper layer 176 and the lower layer 174 are further fused together along a channel system 178.

The channel system 178 preferably includes an upper channel 180 and a lower channel (not shown). The upper channel 180 is preferably formed in the upper layer 176 and the lower channel (not shown) is preferably formed in the lower layer. The upper channel 180 and the lower channel (not shown) are formed by the fusing of the layers 174 and 176 about an approximate planar centerline of the cushion layer [162] *162a*. The fused portion draws the layers 174 and 176 towards the centerline of the cushion layer [162] *162a* and the fluid in between the layers 174 and 176 maintains a thickness around the sides of the fused upper channel 180 and lower channel (not shown). Thus the raised thickness provided by the fluid produces the sides of the upper channel 180 and the lower channel (not shown). At the base of the upper channel 180 and the lower channel (not shown) are apertures 182 which pass through the cushion layer 162. Similar to the cushion layer 162 of FIG. 7, the apertures 182 of the cushion layer [162] *162a* of FIG. 11 closely follow the channel system 166 of the intermediate layer 160. This allows the air from the channel system [166] *178* to pass through the apertures 182 and to the occupant sitting on the climate controlled seat assembly [150] *150a*.

The channel system 178 of the cushion layer [162] *162a* preferably comprises the same general X-shape of the channel system 166 of the intermediate layer 160. As discussed above with reference to the layers 160 and [162] *162a* of FIGS. 7-9, the channel system 178 can be made in any preferable shape. Furthermore, the channel system 178 may not be used at all and the apertures 182 may be formed individually with small areas of fused layers 174 and 176 adjacent to the apertures 182. Such a configuration may allow for more fluid or particulate to be used in the cushion layer [162] *162a*.

Another possible configuration of the cushion layer [162] *162a* may utilize pre-formed apertures 182 in the cushion layer [162] *162a*. Such a configuration may comprise the layers 174 and 176 to be formed from a single piece of plastic, or other suitable material, that may not require fusing of two separate layers. Such a configuration may include the apertures 182 to be pre-formed through the layer [162] *162a* so as to crate a seamless pouch to contain a fluid or particulate. Furthermore, such a seamless pouch may comprise channels or apertures to be formed in the cushion layer [162] *162a*.

The channel system 178 of the cushion layer [162] *162a* further defines four gel pouches 184. The gel pouches 184 are preferably configured to include a fluid or particulate within the pouch that is movable within the pouch. This movability of the fluid within the pouch 184 allows for the cushion layer [162] *162a* to add comfort to the occupant by displacing fluid away from pressure points between an occupant and the seat assembly [150] *150a*.

The cushion layer [162] *162a* is preferably made of a plastic material but can be easily formed of any other suitable material that may contain a fluid or particulate. The plastic material may offer certain benefits when sealing the upper layer 176 and the lower layer 174 in that it can easily be sealed by heat. It may be also appreciated by one in the art that the apertures 182 preferably pass through the sealed portion of the channel system 178 of the cushion layer [162] *162a*. This assures that the gel pouches 184 remain fluid tight and substantially confine a fluid therein without leaking due to the apertures 182.

FIG. 13 illustrates a perspective view of an assembly of another embodiment of a climate controlled seat assembly [150] *150b*. The climate controlled seat assembly [150] *150b* of FIG. 13 is substantially similar to the climate controlled seat systems [150] *150a* of FIG. 7 and FIG. 10. The climate controlled seat assembly [150] *150b* of FIG. 13 includes a climate controlled system 152, a frame 154, a cushion [156] *156b*, comprising a cushion intermediate layer 160 and [162] *162b*, and a cover 158. The frame 154, the intermediate layer 160, the cover 158, and the climate controlled system 152 can be substantially similar to the climate controlled seat assembly embodiment of FIGS. 7 and 10. As described below, the cushion layer [162] *162b* of FIG. 13 does present some differences from the cushion layer [162] *162a* shown in FIGS. 7-12.

With reference to FIGS. 14 and 15, the cushion layer [162] *162b* of the climate controlled seat assembly 150 of FIG. 13 is preferably an air comfort layer [162] *162b*. The air comfort layer [162] *162b* preferably includes a plurality of rectangular shaped air pockets 186 that extend upwards away from a base layer 190. The base layer 190 further comprises apertures 188 which pass through the base layer and are in communication with the channel system 166 of the intermediate layer 160. The air pockets 186 are preferably configured on a grid layout with space in between adjacent air pockets 186. The apertures 188 preferably pass through the base layer 190 in between the air pockets 186 so as to allow the air pockets 186 to be substantially airtight. As similar to the cushion layer [162] *162b* of FIG. 11 and FIG. 12, the apertures 188 of the cushion layer 162 on FIG. 14 and FIG. 15 are arranged to closely follow the channel system 166 of the intermediate layer 160.

Although the embodiment of the climate controlled seat assembly [150] *150b* shown in FIGS. 14 and 15 shows an air comfort layer [162] *162b* with discrete rectangular shaped air pockets 186, other suitable configurations may be used. Such alternate configurations may utilize air pockets 186 of varying size, shape, and orientation such as round or octagonal cylinders in a circular, spiraling, or grid patterns. It is also possible to form air pockets by fusing two layers similar to the fluid cushion layer [162] *162b* of FIGS. 10-12. Such a configuration my include a fused plurality of layers or a single formed pocket with pre-formed apertures as described above with reference to FIG. 10-12. Furthermore, in some embodiments, the air comfort layer [162] *162b* may be configured so that the air pressure inside the air pockets 186 is adjustable.

One advantage that may be realized by the embodiment of the climate controlled seat assembly [150] *150b* of FIG. 13-15 is that when the air flows from the intermediate layer 160 and through the base layer 190 of the cushion layer [162] *162b* the air may then be very evenly distributed using the space between the adjacent pockets 186 as flow passages. This could be particularly advantageous in instances where it may be desirable to achieve an air distribution beyond the pattern of the apertures 188.

Although the embodiments of the climate controlled seat assembly [150] *150a, 150b* shown in FIGS. 7 through 15 include a single climate controlled system 152, it may be appreciated by one skilled in the art that multiple climate controlled systems 152 may be used. One such embodiment is shown in FIGS. 16 and 17.

FIG. 16 is a top view of a frame [154] *154c* with two elongated holes 194 passing through the frame 154. Two climate controlled systems 152 may be mounted in communication with the holes 194 passing through the frame 154 of FIG. 16. This configuration allows for two sources of air to enter the climate controlled seat assembly [150] *150c*. One advantage of such a configuration is that the air may have a shorter distance to travel to distribute air to the climate controlled seat assembly [150] *150c*. This could be advantageous in that the air will have a shorter distance to travel and thus a shorter time to alter the desired temperature (heating of cold air or cooling of hot air).

With reference to FIG. 17, correspondingly the intermediate layer [160] *160c* may include a channel system [166] *166c* that includes two separate distribution channels 172. The distribution channels [172] *172c* of the intermediate layer [160] *160c* of FIG. 17 are not connected by a central portion. Each of the distribution channels shown in FIG. 17 are independently fed air by a climate controlled system 152. In the embodiment shown in FIGS. 16 and 17, the climate controlled seat assembly [150] *150c* may include the layers 162 of FIG. 7, 10 or 13 as may be appreciated by one skilled in the art.

Another feature of the frame 154 of FIG. 16 is that the holes 194 are located at distal ends of the distribution channels 172. This allows the air from the climate control systems 152 to enter at one end of the distribution channels 172. In some other embodiments the holes 194 may be located in a more central location of the frame [154] *154c* so as to feed air to a central portion of the distribution channels [172] *172c*. It has also been contemplated that the location of the holes 194 may be used in combination with any of the aforementioned embodiments of the climate controlled seat assembly [150] *150c*. One such example could include a single hole 194 that is located at a distal end of a distribution channel 172 of FIG. 3 so as to feed air to the channel system 166 from a single distal end.

Although the embodiment of the climate control seat system has been disclosed with reference to a seat back as illustrated in FIGS. 7-17, it has also been contemplated that in some embodiments the system may comprise other portions of seats such as side panels, arm rests or head rests. Such other embodiments could be easily achieved using the above disclosed technology.

Furthermore, it has been disclosed in the above described embodiments that the climate controlled system 152 of FIGS. 7-17 is attached to a frame 154. Other embodiments may include a remote climate control system 152 that is in communication with the climate control seat assembly 150 by means of passageways such as tubing or hoses. Such tubing or hoses can further be in communication with multiple portions of a seat such as arm rests or head rests by a branching system of passageways. Such a configuration could be achieved with a single or multiple climate control systems 152.

Although the above described embodiments of the climate controlled systems of FIGS. 1-17 have been described with reference to seats, it has been contemplated that the technology may be also used with beds. One such embodiment may employ some of the features, aspects, or advantages disclosed with reference to FIGS. 1-6. Such an embodiment may employ the apertures to be formed in a mattress or along sides of the mattress, while the channels or recesses may be formed in support member of the box spring or mattress foundation. Such an embodiment may be particularly advantageous when using a viscoelastic mattress and may also be used with other mattresses such as those utilizing air or water.

Furthermore, another embodiment of a climate controlled system comprising a bed may utilize the technology described in FIGS. 7-17. Such an embodiment may comprise apertures to be formed in a mattress layer and channels or recesses to be formed and a support member of a box support, which may comprise an intermediate layer. Additionally, such an embodiment of a climate controlled bed may comprise an additional intermediate layer which may comprise a portion of a support box or a mattress. Such an embodiment comprising an additional intermediate layer may include a mattress with an additional air cushion layer wherein the additional air cushion layer may comprise apertures for the passage of air. Such an embodiment may be configured similarly to the seat cushion 150 of FIG. 13 and may further comprise the air cushion layer to be adjustable.

To assist in the description of the disclosed embodiments, words such as upward, upper, downward, lower, vertical, horizontal, upstream, and downstream have and used above to describe the accompanying figures. It will be appreciated, however, that the illustrated embodiments can be located and oriented in a variety of desired positions.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

[1. A climate-controlled seating assembly, comprising:

a cushion having an outer surface, said outer surface comprising a first side for receiving and supporting an occupant and a second side, said second side facing in a generally opposite direction than said first side;

a plurality of fluid passages extending through an interior of the cushion, from the first side to the second side of said cushion, wherein said fluid passages are configured to facilitate a transfer of air from the second side to the first side of the cushion;

a support member positioned adjacent the second side of the cushion, said support member comprising a front surface configured to contact at least a portion of the second side of the cushion;

wherein the support member further comprises a rear surface, said rear surface being generally opposite of the first surface;

at least one fluid distribution system positioned along the front surface of the support member, wherein said at least one fluid distribution system comprises at least one recess within the front surface of the support member;

wherein the at least one fluid distribution system does not extend to the rear surface of the support member;

wherein the front surface of the support member directly contacts the second side of the cushion member in areas adjacent the at least one recess and along a majority of an interface between the support member and the cushion member;

wherein the at least one recess of the at least one fluid distribution system forms at least one fluid channel when the support member is secured to the cushion, said at least one fluid channel being in fluid communication with at least one of the fluid passages of the cushion; and a fluid module in fluid communication with the at least one fluid channel;

wherein, when in use, the fluid module is configured to deliver air into said at least one fluid channel and to at least some of the fluid passages, toward the first side of the cushion; and wherein, when in use, air directed into the at least one fluid channel is configured to be distributed at least partially laterally within said at least one fluid channel.]

2. The seating assembly of claim [1] *8*, wherein the fluid module comprises a fluid transfer device and at least one thermal conditioning device, said at least one thermal conditioning device being configured to selectively heat or cool air.

3. The seating assembly of claim 2, wherein the at least one thermal conditioning device comprises at least one of a thermoelectric device and a convective heater.

4. The seating assembly of claim [1] *8*, wherein the fluid module is positioned adjacent the rear surface of the *structural* support member.

5. The seating assembly of claim [1] *8*, wherein the fluid module is positioned at least partially within the at least one fluid channel.

6. The seating assembly of claim [1] *8*, wherein the fluid module is positioned completely within the at least one fluid channel.

[7. The seating assembly of claim 1, wherein the support member comprises a plastic material.]

8. [The seating assembly of claim 1.] *A climate-controlled seating assembly, comprising:*

*a cushion having an outer surface, said outer surface comprising a first side for receiving and supporting an occupant and a second side, said second side facing in a generally opposite direction than said first side;*

*a plurality of fluid passages extending through an interior of the cushion, from the first side to the second side of said cushion, wherein said fluid passages are configured to facilitate a transfer of air from the second side to the first side of the cushion;*

*a structural support member positioned adjacent the second side of the cushion, said structural support member comprising a front surface facing the second side of the cushion and configured to contact at least a portion of the second side of the cushion;*

*wherein the structural support member further comprises a rear surface, said rear surface being generally opposite of the front surface;*

*at least one fluid distribution system positioned along the front surface of the structural support member, wherein said at least one fluid distribution system comprises at least one recess within the front surface of structural support member;*

*wherein the at least one fluid distribution system does not extend to the rear surface of the structural support member;*

*wherein the front surface of the structural support member directly contacts the second side of the cushion member in areas of the second side adjacent the at least one recess and along a majority of an interface between structural support member and the cushion member;*

*wherein the at least one recess of the at least one fluid distribution system forms at least one fluid channel when the structural support member is secured to the cushion, said at least one fluid channel being in fluid communication with at least one of the fluid passages of the cushion;*

*a fluid module in fluid communication with the at least one fluid channel;*

*wherein the at least one fluid channel extends at least partially laterally along the second side of the cushion; and* wherein the *structural* support member comprises a metallic material.

9. The seating assembly of claim [1] *8*, wherein the seating assembly comprises a seat.

10. The seating assembly of claim [1] *8*, wherein the seating assembly comprises a bed.

[11. The seating assembly of claim 1, wherein the at least one fluid channel does not extend along an entire portion or substantially an entire portion of the second side of the cushion.]

12. The seating assembly of claim [1] *8*, wherein the at least one fluid channel comprises a U-shape, V-shape or semi-circular shape.

[13. A climate-controlled seating assembly, comprising:

a cushion having an outer surface, said outer surface comprising a first side for supporting an occupant and a second side, said second side facing in a generally opposite direction than said first side;

wherein at least a portion of the cushion is generally air permeable so as to permit air to pass from the second side to the first side of said cushion;

a support member positioned adjacent the second side of the cushion, said support member comprising a front surface configured to contact at least a portion of the second side of the cushion;

wherein the support member further comprises a rear surface, said rear surface being generally opposite of the first surface;

at least one fluid distribution system formed along the front surface of the support member, wherein said at least one fluid distribution system comprises at least one recess within said front surface;

wherein the support member comprises a first uniform thickness along the at least one recess and a second uniform thickness along a remaining area of the support member, wherein the second uniform thickness is greater than the first uniform thickness;

wherein the at least one recess of the at least one fluid distribution system and the adjacent second side of the cushion together form at least one fluid channel when the support member is secured to said cushion wherein, when in use, air from a fluid module in fluid communication with the at least one fluid channel is configured to be delivered into said at least one fluid channel and at least partially through an air permeable portion of the cushion, toward the first side of the cushion; and wherein, when in use, air directed into the at least one fluid channel is configured to be distributed at least partially laterally within said at least one fluid channel.]

[14. The seating assembly of claim 13, wherein the seating assembly additionally comprises the fluid module that is in fluid communication with the at least one fluid channel.]

15. The seating assembly of claim [14] *20*, wherein the fluid module comprises a fluid transfer device and at least one thermal conditioning device, said at least one thermal conditioning device being configured to selectively heat or cool air.

16. The seating assembly of claim 15, wherein the at least one thermal conditioning device comprises at least one of a thermoelectric device and a convective heater.

17. The seating assembly of claim [14] *20*, wherein the fluid module is positioned adjacent the rear surface of [the] *structural* support member.

18. The seating assembly of claim [14] *20*, wherein the fluid module is positioned at least partially within the at least one fluid channel.

[19. The seating assembly of claim 13, wherein the support member comprises a plastic material.]

20. [The seating assembly of claim 13,] *A climate-controlled seating assembly, comprising:*

*a cushion having an outer surface, said outer surface comprising a first side for supporting an occupant and a second side, said second side facing in a generally opposite direction than said first side;*

*wherein at least a portion of the cushion is generally air permeable so as to permit air to pass from the second side to the first side of said cushion;*

*a structural support member positioned adjacent the second side of the cushion, said structural support member comprising a front surface facing the second side of the cushion and configured to contact at least a portion of the second side of the cushion;*

*wherein the structural support member further comprises a rear surface, said rear surface being generally opposite of the front surface;*

*at least one fluid distribution system formed along the front surface of the structural support member, wherein said at least one fluid distribution system comprises at least one recess within said front surface;*

*wherein the structural support member comprises a first uniform thickness along the at least one recess and a second uniform thickness along a remaining area of the structural support member, wherein the second uniform thickness is greater than the first uniform thickness;*

*wherein the at least one recess of the at least one fluid distribution system and the adjacent second side of the cushion together form at least one fluid channel when the structural support member is secured to said cushion, the fluid channel being in communication with the portion of the cushion that is generally air permeable;*

*a fluid module in fluid communication with the at least one fluid;*

*wherein the at least one fluid channel extends at least partially laterally along the second side of the cushion; and* wherein the *structural* support member comprises a metallic material.

21. The seating assembly of claim [13] *20*, wherein the seating assembly comprises a seat.

22. The seating assembly of claim [13] *20*, wherein the seating assembly comprises a bed.

[23. The seating assembly of claim 13, wherein the at least one fluid channel does not extend along an entire portion or substantially an entire portion of the second side of the cushion.]

24. The seating assembly of claim [13] *20*, wherein the at least one fluid channel comprises a U-shape, V-shape or semi-circular shape.

25. The seating assembly of claim [13] *20*, wherein the *portion of the* cushion *that is generally air permeable* comprises an air permeable material so that air can be selectively transferred through [a portion of] the cushion, from the second side to the first side of the cushion.

[26. The seating assembly of claim 13, wherein the cushion comprises a plurality of fluid passages that extend from the second side to the first side of the cushion.]

* * * * *